(12) United States Patent  
Yasumatsu et al.

(10) Patent No.: US 11,841,600 B2
(45) Date of Patent: Dec. 12, 2023

(54) WAVELENGTH CONVERSION ELEMENT, LIGHT SOURCE DEVICE, PROJECTOR, AND METHOD OF MANUFACTURING WAVELENGTH CONVERSION ELEMENT

(71) Applicant: SEIKO EPSON CORPORATION, Tokyo (JP)

(72) Inventors: Wataru Yasumatsu, Azumino (JP); Soma Toda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 456 days.

(21) Appl. No.: 17/198,830

(22) Filed: Mar. 11, 2021

(65) Prior Publication Data
US 2021/0286245 A1   Sep. 16, 2021

(30) Foreign Application Priority Data

Mar. 12, 2020  (JP) ................................. 2020-043303

(51) Int. Cl.
| | |
|---|---|
| *G03B 21/20* | (2006.01) |
| *G03B 33/12* | (2006.01) |
| *B32B 3/12* | (2006.01) |
| *B32B 9/00* | (2006.01) |
| *B32B 9/04* | (2006.01) |
| *B32B 15/20* | (2006.01) |

(Continued)

(52) U.S. Cl.
CPC .............. *G03B 21/204* (2013.01); *B32B 7/12* (2013.01); *B32B 9/005* (2013.01); *B32B 9/041* (2013.01); *B32B 15/20* (2013.01); *B32B 37/12* (2013.01); *G03B 33/12* (2013.01); *B32B 2457/00* (2013.01)

(58) Field of Classification Search
None
See application file for complete search history.

(56) References Cited

U.S. PATENT DOCUMENTS

| | | |
|---|---|---|
| 2011/0273863 A1 | 11/2011 | Cai et al. |
| 2017/0137706 A1 | 5/2017 | Fujita et al. |

(Continued)

FOREIGN PATENT DOCUMENTS

| | | |
|---|---|---|
| CN | 108693690 A | 10/2018 |
| CN | 110308606 A | 10/2019 |

(Continued)

*Primary Examiner* — Bao-Luan Q Le
*Assistant Examiner* — Danell L Owens
(74) *Attorney, Agent, or Firm* — Oliff PLC

(57) ABSTRACT

A wavelength conversion element according to the present disclosure includes: a wavelength conversion layer; a first substrate; a second substrate; a first intermediate layer; and a second intermediate layer. A linear expansion coefficient of the first substrate is smaller than a linear expansion coefficient of the wavelength conversion layer. The linear expansion coefficient of the wavelength conversion layer is smaller than a linear expansion coefficient of the second substrate. The linear expansion coefficient of the first substrate is smaller than the linear expansion coefficient of the second substrate. A thermal conductivity of the first substrate is larger than a thermal conductivity of the wavelength conversion layer. A thermal conductivity of the second substrate is larger than the thermal conductivity of the wavelength conversion layer.

12 Claims, 8 Drawing Sheets

(51) Int. Cl.
    *B32B 7/12*         (2006.01)
    *B32B 37/12*       (2006.01)

(56) References Cited

U.S. PATENT DOCUMENTS

2018/0284340 A1   10/2018   Koizumi et al.
2019/0294033 A1*   9/2019   Yokoo .................. G03B 21/204

FOREIGN PATENT DOCUMENTS

| JP | 2013-531367 A | 8/2013 |
| JP | 2016-027613 A | 2/2016 |
| JP | 2018-136511 A | 8/2018 |
| JP | 2019-035843 A | 3/2019 |

* cited by examiner

WAVELENGTH CONVERSION ELEMENT, LIGHT SOURCE DEVICE, PROJECTOR, AND METHOD OF MANUFACTURING WAVELENGTH CONVERSION ELEMENT

The present application is based on, and claims priority from JP Application Serial Number 2020-043303, filed Mar. 12, 2020, the disclosure of which is hereby incorporated by reference herein in its entirety.

BACKGROUND

1. Technical Field

The present disclosure relates to a wavelength conversion element, a light source device, a projector, and a method of manufacturing a wavelength conversion element.

2. Related Art

A light source device using fluorescence emitted from a fluorescent body when the fluorescent body is irradiated with excitation light emitted from a light emitting element is proposed to be a light source device for a projector. The following JP-A-2016-27613 discloses a wavelength conversion member including a fluorescent body layer, a light transmissive heat dissipation layer, and a heat dissipation member.

The following JP-A-2018-136511 discloses a wavelength conversion device including a fluorescent body and a holding member that holds a side surface of the fluorescent body. Further, JP-A-2018-136511 discloses that, since a YAG raw material can be crystallized to synthesize the fluorescent body and an $Al_2O_3$ material can be sintered to produce the holding member, the fluorescent body and the holding member can be covalently bonded or ionic bonded to each other at an interface therebetween; thereby, no member is interposed between the fluorescent body and the holding member, so that thermal conductivity from the fluorescent body to the holding member is increased, and a temperature rise in the fluorescent body can be prevented.

In the wavelength conversion member of JP-A-2016-27613, heat is generated in the fluorescent body layer when the fluorescent body layer is irradiated with excitation light. When a linear expansion coefficient differs among members including the fluorescent body layer, the light transmissive heat dissipation layer, and the heat dissipation member, peeling off may occur in the members due to thermal stress generated in the members due to the heat generated in the fluorescent body layer. In addition, when there is a step of heating the members in a process of manufacturing the wavelength conversion member, the same peeling off may occur.

Further, as disclosed in JP-A-2018-136511, in the wavelength conversion device in which the fluorescent body and the holding member are bonded to each other by using the chemical bond, it is conceivable that heat dissipation may be insufficient only by the holding member arranged on the side surface of the fluorescent body. In this case, when the heat dissipation member disclosed in JP-A-2016-27613 is used, the thermal stress is generated among the members due to a difference in the linear expansion coefficient among the members, and the members may be peeled off from each other.

SUMMARY

In order to solve the above problems, a wavelength conversion element according to an aspect of the present disclosure includes: a wavelength conversion layer configured to convert light in a first wavelength band into light in a second wavelength band different from the first wavelength band; a first substrate; a second substrate; a first bonding layer bonding the wavelength conversion layer to the first substrate; and a second bonding layer bonding any one of the wavelength conversion layer and the first substrate to the second substrate. A linear expansion coefficient of the first substrate is smaller than a linear expansion coefficient of the wavelength conversion layer. The linear expansion coefficient of the wavelength conversion layer is smaller than a linear expansion coefficient of the second substrate. The linear expansion coefficient of the first substrate is smaller than the linear expansion coefficient of the second substrate. A thermal conductivity of the first substrate is larger than a thermal conductivity of the wavelength conversion layer. A thermal conductivity of the second substrate is larger than the thermal conductivity of the wavelength conversion layer. A thickness of the first bonding layer is smaller than a thickness of the wavelength conversion layer. The thickness of the first bonding layer is smaller than a thickness of the first substrate. The thickness of the first bonding layer is smaller than a thickness of the second bonding layer.

A light source device according to another aspect of the present disclosure includes: the wavelength conversion element according to the aspect of the present disclosure; and a light emitting element configured to emit the light in the first wavelength band to the wavelength conversion element.

A projector according to another aspect of the present disclosure includes: the light source device according to the aspect of the present disclosure; a light modulation device configured to modulate light from the light source device in accordance with image information; and a projection optical device configured to project the light modulated by the light modulation device.

A method of manufacturing a wavelength conversion element according to another aspect of the present disclosure includes: a first step of forming a first bonding layer on a wavelength conversion layer; a second step of forming a second bonding layer on a first substrate; a third step, which is after the first step and second step, of bonding, to a second substrate by a third bonding layer, any one of a surface of the wavelength conversion layer different from a surface on which the first bonding layer is formed and a surface of the first substrate different from a surface on which the second bonding layer is formed; and a fourth step, which is after the third step, of bonding the first bonding layer and the second bonding layer to form a fourth bonding layer. A linear expansion coefficient of the first substrate is smaller than a linear expansion coefficient of the wavelength conversion layer. The linear expansion coefficient of the wavelength conversion layer is smaller than a linear expansion coefficient of the second substrate. The linear expansion coefficient of the first substrate is smaller than the linear expansion coefficient of the second substrate.

DESCRIPTION OF EXEMPLARY EMBODIMENTS

First Embodiment

Hereinafter, a first embodiment of the present disclosure will be described with reference to FIGS. 1 to 3 and FIGS. 4A to 4D.

In the following drawings, a scale of dimensions may be changed depending on components in order to make the respective components easy to see.

An example of a projector according to the present embodiment will be described.

Figure 1:
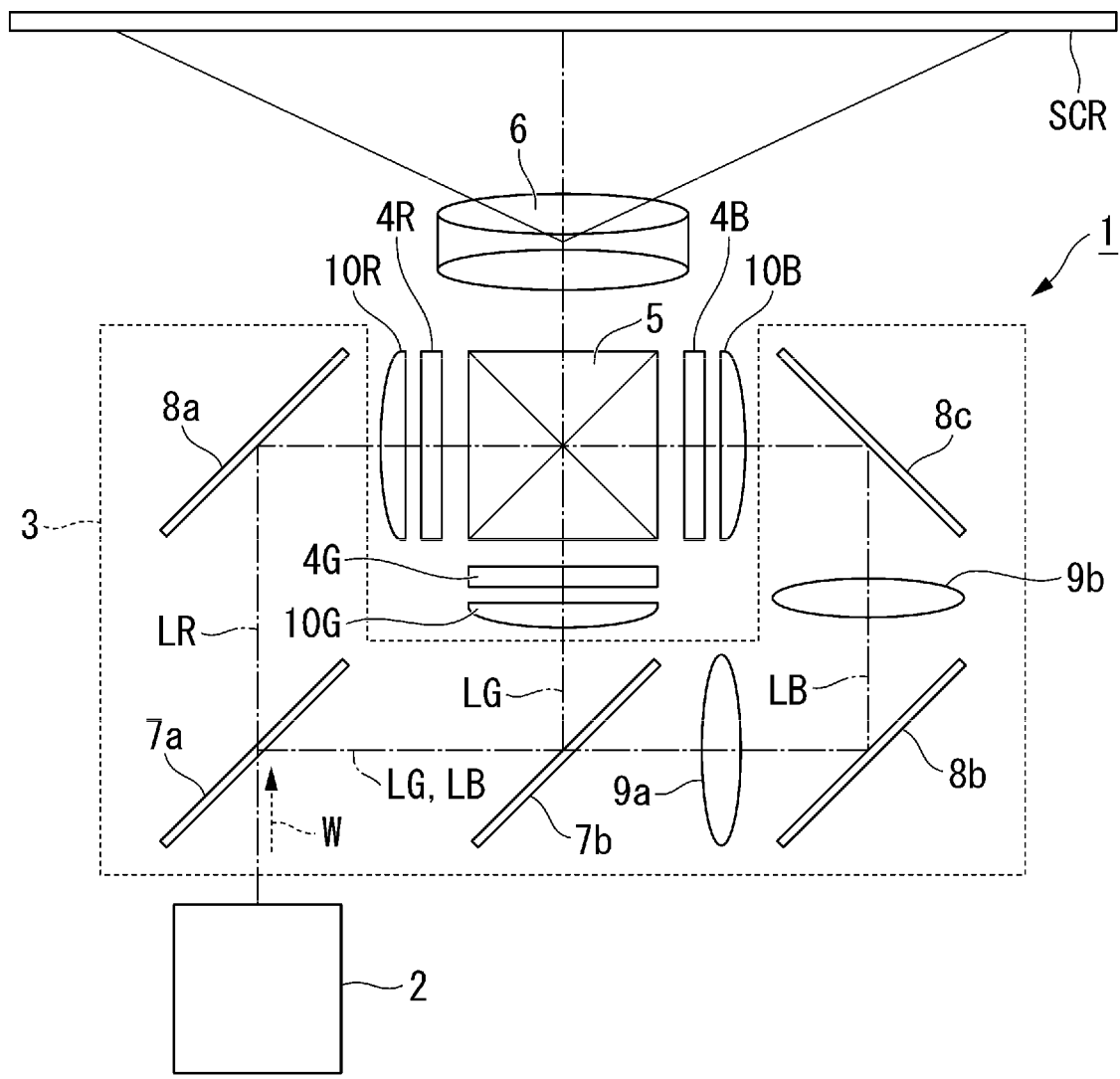
FIG. 1 is a schematic configuration diagram of a projector according to a first embodiment.

FIG. 1 is a diagram showing a schematic configuration of a projector 1 according to the present embodiment.

As shown in FIG. 1, the projector 1 according to the present embodiment is a projection type image display device that displays a color image on a screen SCR. The projector 1 includes an illumination device 2, a color separation optical system 3, a light modulation device 4R, a light modulation device 4G, a light modulation device 4B, a synthetic optical system 5, and a projection optical device 6. A configuration of the illumination device 2 will be described later.

The color separation optical system 3 includes a first dichroic mirror 7a, a second dichroic mirror 7b, a reflection mirror 8a, a reflection mirror 8b, a reflection mirror 8c, a relay lens 9a, and a relay lens 9b. The color separation optical system 3 separates illumination light WL emitted from the illumination device 2 into red light LR, green light LG, and blue light LB, guides the red light LR to the light modulation device 4R, guides the green light LG to the light modulation device 4G, and guides the blue light LB to the light modulation device 4B.

A field lens 10R is arranged between the color separation optical system 3 and the light modulation device 4R. The field lens 10R substantially parallelizes incident light and makes the incident light emit toward the light modulation device 4R. A field lens 10G is arranged between the color separation optical system 3 and the light modulation device 4G. The field lens 10G substantially parallelizes the incident light and makes the incident light emit toward the light modulation device 4G. A field lens 10B is arranged between the color separation optical system 3 and the light modulation device 4B. The field lens 10B substantially parallelizes the incident light and makes the incident light emit toward the light modulation device 4B.

The first dichroic mirror 7a transmits a red light component and reflects a green light component and a blue light component. The second dichroic mirror 7b reflects the green light component and transmits the blue light component. The reflection mirror 8a reflects the red light component. The reflection mirror 8b and the reflection mirror 8c reflect the blue light component.

The red light LR transmitted through the first dichroic mirror 7a is reflected by the reflection mirror 8a, is transmitted through the field lens 10R, and is incident on an image formation region of the light modulation device 4R for red light. The green light LG reflected by the first dichroic mirror 7a is further reflected by the second dichroic mirror 7b, is transmitted through the field lens 10G, and is incident on an image formation region of the light modulation device 4G for green light. The blue light LB transmitted through the second dichroic mirror 7b passes through the relay lens 9a, the reflection mirror 8b on an incident side, the relay lens 9b, the reflection mirror 8c on an emission side, and the field lens 10B, and is incident on an image formation region of the light modulation device 4B for blue light.

Each of the light modulation device 4R, the light modulation device 4G, and the light modulation device 4B modulates incident color light in accordance with image information to form image light. Each of the light modulation device 4R, the light modulation device 4G, and the light modulation device 4B is constituted by a liquid crystal light valve. Although not shown, an incident side polarization plate is arranged on the light incident side of each of the light modulation device 4R, the light modulation device 4G, and the light modulation device 4B. An emission side polarization plate is arranged on the light emission side of each of the light modulation device 4R, the light modulation device 4G, and the light modulation device 4B.

The synthetic optical system 5 synthesizes the image light emitted from the light modulation device 4R, the light modulation device 4G, and the light modulation device 4B to form full-color image light. The synthetic optical system 5 is constituted by a cross dichroic prism in which four right-angled prisms are bonded together to forma substantially square shape in a plan view. A dielectric multilayer film is formed at a substantially X-shaped interface in which the right-angled prisms are bonded together.

The image light emitted from the synthetic optical system 5 is magnified and projected by the projection optical device 6, and forms an image on the screen SCR. That is, the projection optical device 6 projects the light modulated by the light modulation device 4R, the light modulation device 4G, and the light modulation device 4B. The projection optical device 6 includes a plurality of projection lenses.

An example of the illumination device 2 according to the present embodiment will be described.

Figure 2:
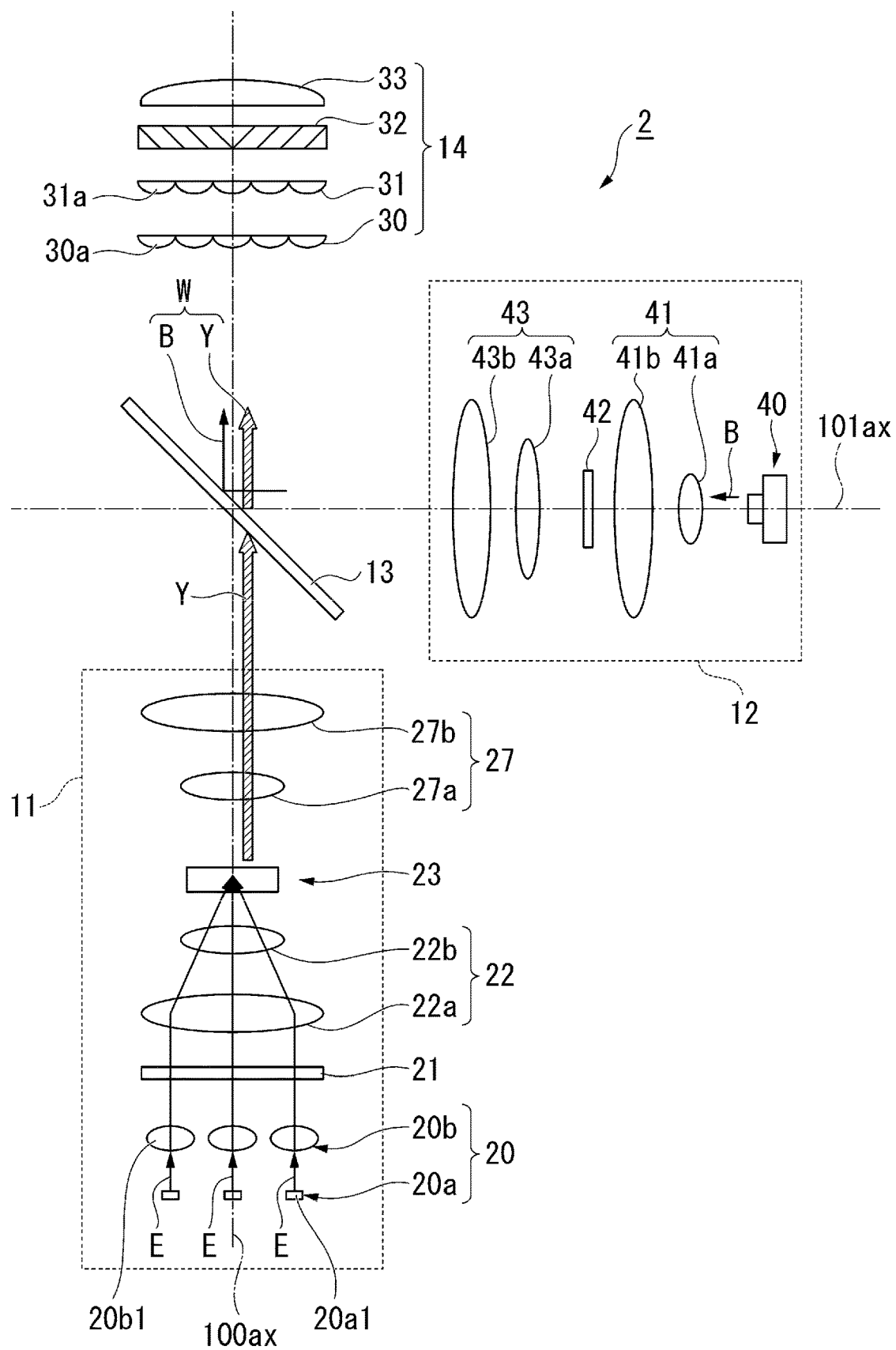
FIG. 2 is a schematic configuration diagram of an illumination device according to the first embodiment.

FIG. 2 is a schematic configuration diagram of the illumination device 2.

As shown in FIG. 2, the illumination device 2 includes a first light source device 11, a second light source device 12, a dichroic mirror 13, and a uniform illumination unit 14. The first light source device 11 according to the present embodiment corresponds to a light source device in the claims.

The first light source device 11 includes a light source unit 20 having a light emitting element 20a1 that emits excitation light E to a wavelength conversion element 23, a diffusion unit 21, a condensing optical system 22, the wavelength conversion element 23, and a pickup optical system 27.

The first light source unit 20 emits the excitation light E toward the wavelength conversion element 23. The first light source unit 20 includes a light source unit 20a and a collimator optical system 20b. The light source unit 20a includes a plurality of light emitting elements 20a1 that emit blue excitation light E in a first wavelength band. The light emitting element 20a1 is constituted by a semiconductor laser element that emits laser light. A peak wavelength of emission intensity of the excitation light E is, for example, 445 nm. The plurality of light emitting elements 20a1 are arranged in an array in one plane orthogonal to an illumination optical axis 100ax. The light emitting element 20a1 may emit blue light having a peak wavelength other than 445 nm, for example, a peak wavelength of 455 nm or 460 nm. The illumination optical axis 100ax is defined as an axis along a principal ray of a light beam formed of a plurality of excitation light E emitted from the first light source unit 20.

The collimator optical system 20b includes a plurality of collimator lenses 20b1. One collimator lens 20b1 is provided corresponding to one light emitting element 20a1. The plurality of collimator lenses 20b1 are arranged in an array in one plane orthogonal to the illumination optical axis 100ax. The collimator lenses 20b1 convert the excitation light E emitted from the light emitting elements 20a1 into parallel light.

The diffusion unit 21 diffuses the excitation light E emitted from the first light source unit 20. In the present embodiment, a polished glass plate made of, for example, optical glass can be used as the diffusion unit 21.

The condensing optical system 22 condenses the excitation light E diffused by the diffusion unit 21 and causes the excitation light E to be incident on the wavelength conversion element 23. In the present embodiment, the condensing optical system 22 includes a first lens 22a and a second lens 22b. Each of the first lens 22a and the second lens 22b is constituted by a convex lens. In this way, the cost of the first light source device 11 can be reduced by adopting the condensing optical system 22 having a simple configuration. The configuration of the wavelength conversion element 23 will be described later.

The pickup optical system 27 includes a first collimator lens 27a and a second collimator lens 27b. The pickup optical system 27 substantially parallelizes fluorescence Y emitted from the wavelength conversion element 23. Each of the first collimator lens 27a and the second collimator lens 27b is constituted by a convex lens.

The fluorescence Y parallelized by the pickup optical system 27 is incident on the dichroic mirror 13. The dichroic mirror 13 is arranged so as to intersect each of an optical axis 101ax of the second light source device 12 and the illumination optical axis 100ax at an angle of 45°. The dichroic mirror 13 has a characteristic of transmitting the fluorescence Y and reflecting blue light B from the second light source device 12. The optical axis 101ax is defined as an axis along the principal ray of the blue light B emitted from a second light source 40.

The second light source device 12 includes the second light source 40, a second condensing optical system 41, a scattering plate 42, and a second pickup optical system 43.

The second light source 40 has the same configuration as the first light source unit 20. In the present embodiment, the second light source 40 includes a semiconductor laser that emits the blue light B and a collimator lens that parallelizes the blue light B emitted from the semiconductor laser. The second light source 40 may have at least one semiconductor laser and at least one collimator lens, and may have a plurality of semiconductor lasers and a plurality of collimator lenses, which is similar to the first light source unit 20.

The second condensing optical system 41 includes a first lens 41a and a second lens 41b. The second condensing optical system 41 condenses the blue light B emitted from the second light source 40 in the vicinity of the scattering plate 42. Each of the first lens 41a and the second lens 41b is constituted by a convex lens.

The scattering plate 42 scatters the blue light B emitted from the second condensing optical system 41, and converts the blue light B having a light distribution similar to the light distribution of the fluorescence Y generated in the first light source device 11. A polished glass made of, for example, optical glass is used as the scattering plate 42.

The second pickup optical system. 43 includes a first lens 43a and a second lens 43b. The second pickup optical system 43 substantially parallelizes the light emitted from the scattering plate 42. Each of the first lens 43a and the second lens 43b is constituted by a convex lens.

In the present embodiment, the blue light B from the second light source device 12 is reflected by the dichroic mirror 13. The blue light B reflected by the dichroic mirror 13 is synthesized with the yellow fluorescence Y emitted from the first light source device 11 and transmitted through the dichroic mirror 13, to form white light W. Then, the white light W is incident on the uniform illumination unit 14.

The uniform illumination unit 14 includes a first lens array 30, a second lens array 31, a polarization conversion element 32, and a superimposing lens 33.

The first lens array 30 includes a plurality of first lenses 30a for dividing the light emitted from the dichroic mirror 13 into a plurality of partial light beams. The plurality of first lenses 30a are arranged in a matrix in a plane orthogonal to the illumination optical axis 100ax.

The second lens array 31 includes a plurality of second lenses 31a corresponding to the plurality of first lenses 30a of the first lens array 30. The second lens array 31, together with the superimposing lens 33, forms an image of each first lens 30a of the first lens array 30 in the vicinity of the image formation regions of the light modulation devices 4R, 4G, and 4B. The plurality of second lenses 31a are arranged in a matrix in a plane orthogonal to the illumination optical axis 100ax.

The polarization conversion element 32 converts the white light W into linearly polarized light having a specific oscillation direction. The polarization conversion element 32 includes a polarization separation film, a retardation plate, and a mirror. The polarization conversion element 32 converts one linearly polarized light component into the other linearly polarized light component in order to align a polarization direction of the unpolarized fluorescence Y with a polarization direction of the blue light B. The polarization conversion element 32 converts, for example, a P-polarized component into an S-polarized component.

The superimposing lens 33 condenses the partial light beams from the polarization conversion element 32 and superimposes the light beams in the vicinity of the image formation regions of the light modulation devices 4R, 4G, and 4B. The first lens array 30, the second lens array 31, and the superimposing lens 33 constitute an integrator optical system that makes in-plane light intensity distribution of the white light W uniform.

Next, a configuration of the wavelength conversion element 23 will be described.

Figure 3:
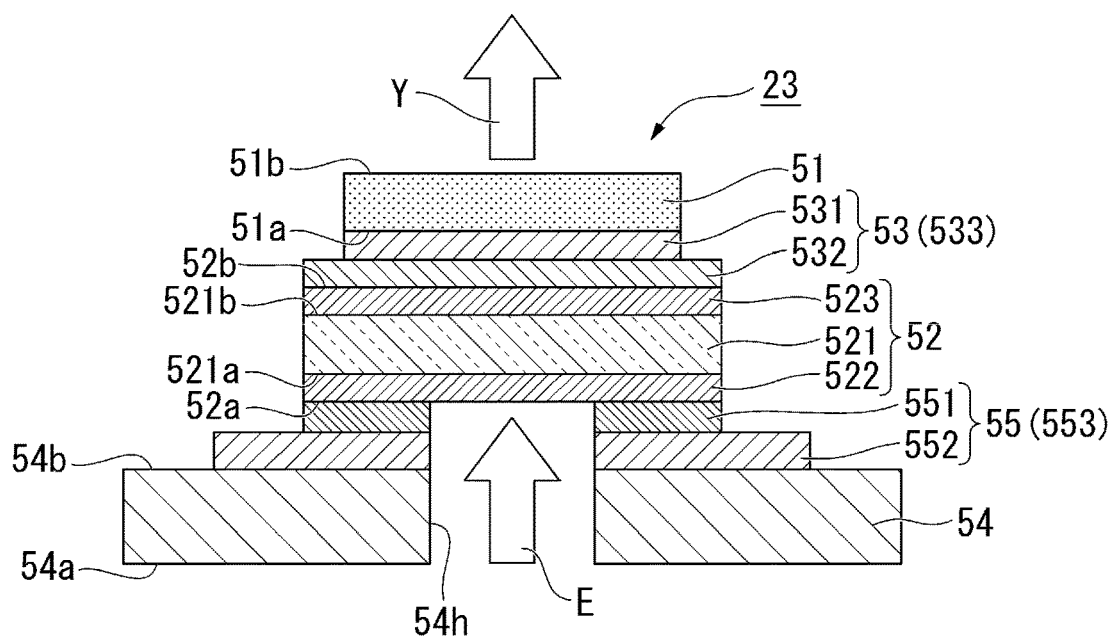
FIG. 3 is a cross-sectional view of a wavelength conversion element according to the first embodiment.

FIG. 3 is a cross-sectional view of the wavelength conversion element 23 according to the present embodiment.

As shown in FIG. 3, the wavelength conversion element 23 includes a wavelength conversion layer 51, a first substrate 52, a first intermediate layer 53, a second substrate 54, and a second intermediate layer 55. The second substrate 54, the second intermediate layer 55, the first substrate 52, the first intermediate layer 53, and the wavelength conversion layer 51 are stacked in this order from a side where the excitation light E is incident.

The wavelength conversion layer 51 has a first surface 51a on which the excitation light E is incident, and a second surface 51b which is different from the first surface 51a and causes the fluorescence Y to be emitted. That is, in the wavelength conversion layer 51, the excitation light E in the first wavelength band is incident on the first surface 51a, and the fluorescence Y in a second wavelength band is emitted from the second surface 51b. The wavelength conversion layer 51 includes a ceramic fluorescent body that converts the excitation light E in the first wavelength band into the fluorescence Y in the second wavelength band different from the first wavelength band. The second wavelength band is, for example, 490 nm to 750 nm. The fluorescence Y is yellow light including the green light component and the red light component. The wavelength conversion layer 51 may include a single crystal fluorescent body.

The wavelength conversion layer 51 includes, for example, an yttrium aluminum garnet (YAG)-based fluorescent body. Taking YAG:Ce, which contains cerium (Ce) as an activator, as an example, a material in which raw material powders containing constituent elements such as $Y_2O_3$, $Al_2O_3$, and $CeO_3$ are mixed and subjected to a solid-phase reaction, Y—Al—O amorphous particles obtained by a wet method such as a coprecipitation method or a Solgel method, and YAG particles obtained by a vapor phase method such as a spray drying method, a flame thermal decomposition method, or a thermal plasma method can be used as the wavelength conversion layer 51.

A linear expansion coefficient of the YAG constituting the wavelength conversion layer 51 is $8 \times 10^{-6}/°$ C. A thermal conductivity of YAG constituting the wavelength conversion layer is 8 W/mm·K to 11 W/mm·K. A thickness of the wavelength conversion layer 51 is 40 μm to 200 μm, and preferably 50 μm to 100 μm. In the specification, the thickness of each layer is defined as a size in a direction along an incident direction of the excitation light E or light BL.

The first substrate 52 is provided to face the first surface 51a of the wavelength conversion layer 51. The first substrate 52 includes a ceramic heat dissipation substrate 521, a first reflection layer 522, and a second reflection layer 523. The ceramic heat dissipation substrate 521 has a first surface 521a on which the excitation light E is incident and a second surface 521b different from the first surface 521a. The ceramic heat dissipation substrate 521 is made of, for example, a ceramic material such as silicon carbide (SiC).

The first reflection layer 522 is provided on the first surface 521a of the ceramic heat dissipation substrate 521. The second reflection layer 523 is provided on the second surface 521b of the ceramic heat dissipation substrate 521.

Each of the first reflection layer 522 and the second reflection layer 523 is formed of two types of dielectric films having different refractive indexes, for example, a dielectric multilayer film in which a silicon oxide film and a titanium oxide film are alternately stacked.

Each of the first reflection layer 522 and the second reflection layer 523 has a characteristic of transmitting the light in the first wavelength band and reflecting the light in the second wavelength band. That is, each of the first reflection layer 522 and the second reflection layer 523 transmits the excitation light E and reflects the fluorescence Y. In the present embodiment, since the first reflection layer 522 is provided in addition to the second reflection layer 523, the fluorescence Y emitted from the wavelength conversion layer 51 and transmitted through the second reflection layer 523 without being reflected by the second reflection layer 523 can be reflected by the first reflection layer 522 and returned to the wavelength conversion layer 51. Accordingly, an amount of the fluorescence Y emitted from the second surface 51b of the wavelength conversion layer 51 can be increased.

A linear expansion coefficient of SiC constituting the ceramic heat dissipation substrate 521 is 4 to $5 \times 10^{-6}/°$ C. A thermal conductivity of SiC constituting the ceramic heat dissipation substrate 521 is 300 W/mm·K to 500 W/mm·K. A thickness of the ceramic heat dissipation substrate 521 is 0.2 mm to 1 mm, for example, 0.5 mm. Since the thickness of the ceramic heat dissipation substrate 521 is sufficiently thicker than the thickness of the first reflection layer 522 and the second reflection layer 523, it is considered that a physical property and thickness of the first substrate 52 can be approximated by a physical property and thickness of the ceramic heat dissipation substrate 521. Therefore, a linear expansion coefficient of the first substrate 52 is 4 to $5 \times 10^{-6}/°$ C. A thermal conductivity of the first substrate 52 is 300 W/mm·K to 500 W/mm·K. A thickness of the first substrate 52 is 0.2 mm to 1 mm.

An area of the first surface 51a of the wavelength conversion layer 51 is smaller than an area of the second surface 52b of the first substrate 52. Therefore, when viewed from a normal direction of the second surface 52b, a peripheral edge portion of the first substrate 52 protrudes to the outside of the wavelength conversion layer 51.

The first intermediate layer 53 is provided between the wavelength conversion layer 51 and the first substrate 52. The first intermediate layer 53 includes a first bonding layer 531 provided on the first surface 51a of the wavelength conversion layer 51, and a second bonding layer 532 provided on the second surface 52b of the first substrate 52. Each of the first bonding layer 531 and the second bonding layer 532 is formed of a siloxane compound having high light transmittance. In the present embodiment, each of the first bonding layer 531 and the second bonding layer 532 is formed of octamethyltrisiloxane. Since the first bonding layer 531 is provided on the first surface 51a of the wavelength conversion layer 51, and the second bonding layer 532 is provided on the second surface 52b of the first substrate 52, the area of the first bonding layer 531 is smaller than the area of the second bonding layer 532. Therefore, when viewed from the normal direction of the second surface 52b, a peripheral edge portion of the second bonding layer 532 protrudes to the outside of the first bonding layer 531.

A thermal conductivity of octamethyltrisiloxane constituting the first intermediate layer 53 is 0.2 W/mm·K. A Young's modulus of octamethyltrisiloxane constituting the first intermediate layer 53 is 72 GPa when considered to be equivalent to a Young's modulus of the silicon oxide. A thickness of the first intermediate layer 53 is 0.2 μm to 1 μm.

The second substrate 54 is provided to face the first surface 52a of the first substrate 52. The second substrate 54 has a first surface 54a facing the second lens 22b of the condensing optical system 22 illustrated in FIG. 2 and a second surface 54b different from the first surface 54a. The second substrate 54 is made of a metal material having high thermal conductivity, such as copper or aluminum. In the present embodiment, the second substrate 54 is made of copper. The second substrate 54 is provided with an opening 54h that penetrates the first surface 54a and the second surface 54b. Since the opening 54h is provided in the second substrate 54, the excitation light E applied to the wavelength conversion element 23 is incident on the first reflection layer 522 through the opening 54h.

A linear expansion coefficient of copper constituting the second substrate 54 is $16.8 \times 10^{-6}/°$ C. A thermal conductivity of copper constituting the second substrate 54 is 400 W/mm·K. A thickness of the second substrate 54 is 1.0 mm to 5.0 mm.

The second intermediate layer 55 is provided between the first substrate 52 and the second substrate 54. The second intermediate layer 55 includes a silver layer 551 provided on a peripheral edge portion of the first reflection layer 522 of the first substrate 52, and a nano-silver layer 552 provided on the second surface 54b of the second substrate 54. The nano-silver layer 552 is formed by firing a paste containing nano-silver particles at 200° C. to 300° C. The silver layer 551 is provided on the first reflection layer 522. The nano-silver layer 552 is provided on the second substrate 54. The area of the silver layer 551 is smaller than the area of the nano-silver layer 552. Therefore, when viewed from the normal direction of the second surface 51b, a peripheral edge portion of the nano-silver layer 552 protrudes to the outside of the silver layer 551. The area of the nano-silver layer 552 is smaller than the area of the second surface 54b of the second substrate 54. Therefore, when viewed from a normal direction of the second surface 51b, a peripheral edge portion of the second substrate 54 protrudes to the outside of the nano-silver layer 552.

A thermal conductivity of silver constituting the second intermediate layer 55 is 150 W/mm·K to 213 W/mm·K. A Young's modulus of silver constituting the second intermediate layer 55 is 15 GPa to 30 GPa. A thickness of the second intermediate layer 55 is 30 μm to 60 μm.

An anti-reflection layer may be provided on the second surface 51b of the wavelength conversion layer 51. A well-known anti-reflection film can be used as the anti-reflection layer.

A relationship regarding the physical property and the thickness between members is as follows.

The linear expansion coefficient of the first substrate 52 (SiC) is smaller than the linear expansion coefficient of the wavelength conversion layer 51 (YAG). The linear expansion coefficient of the wavelength conversion layer 51 (YAG) is smaller than the linear expansion coefficient of the second substrate 54 (Cu). The linear expansion coefficient of the first substrate 52 (SiC) is smaller than the linear expansion coefficient of the second substrate 54 (Cu). The thermal conductivity of the first substrate 52 (SiC) is larger than the thermal conductivity of the wavelength conversion layer 51 (YAG). The thermal conductivity of the second substrate 54 (Cu) is larger than the thermal conductivity of the wavelength conversion layer 51 (YAG). The thickness of the first intermediate layer 53 (octamethyltrisiloxane) is smaller than the thickness of the wavelength conversion layer 51 (YAG).

The thickness of the first intermediate layer 53 (octamethyltrisiloxane) is smaller than the thickness of the first substrate 52 (SiC). The thickness of the first intermediate layer 53 (octamethyltrisiloxane) is smaller than the thickness of the second intermediate layer 55 (silver). The Young's modulus of the second intermediate layer 55 (silver) is smaller than the Young's modulus of the first intermediate layer 53 (octamethyltrisiloxane).

A method of manufacturing the wavelength conversion element 23 according to the present embodiment will be described below.

FIGS. 4A to 4D are cross-sectional views showing the method of manufacturing the wavelength conversion element 23 according to the present embodiment in order of steps.

Figure 4A:
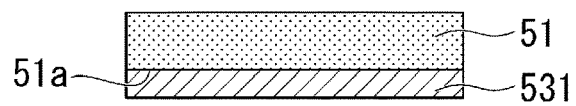
FIG. 4A is a cross-sectional view showing one step of a method of manufacturing the wavelength conversion element according to the first embodiment.

First, as shown in FIG. 4A, the first bonding layer 531 is formed on the first surface 51a of the wavelength conversion layer 51 (first step). At this time, an octamethyltrisiloxane film is formed on the first surface 51a of the wavelength conversion layer 51 using a plasma CVD method, and the first bonding layer 531 made of the octamethyltrisiloxane is formed.

Figure 4B:
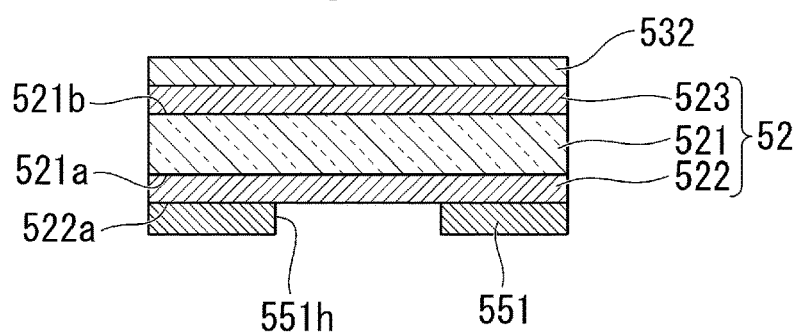
FIG. 4B is a cross-sectional view showing a step subsequent to FIG. 4A.

Next, as shown in FIG. 4B, a dielectric multilayer film is formed on the first surface 521a of the ceramic heat dissipation substrate 521 by a vapor deposition method, a sputtering method, or the like, and the first reflection layer 522 is formed. Similarly, a dielectric multilayer film is formed on the second surface 521b of the ceramic heat dissipation substrate 521 by a vapor deposition method, a sputtering method, or the like, and the second reflection layer 523 is formed. Accordingly, the first substrate 52 on which the first reflection layer 522 is formed on the first surface 521a of the ceramic heat dissipation substrate 521 and the second reflection layer 523 is formed on the second surface 521b of the ceramic heat dissipation substrate 521 is produced. The order of forming the first reflection layer 522 and the second reflection layer 523 may be reversed.

Next, the silver layer 551 is formed on the first surface 522a of the first reflection layer 522. At this time, the silver layer 551 having an opening 551h is formed by a vapor deposition method using a mask, a sputtering method, or the like. Alternatively, the silver layer 551 is formed over the entire first surface 522a of the first reflection layer 522 by a vapor deposition method, a sputtering method, or the like, and then the opening 551h is formed in a central portion of the silver layer 551 by etching.

Next, the second bonding layer 532 is formed on the second reflection layer 523 of the first substrate 52 (second step). At this time, as in the first step, an octamethyltrisiloxane film is formed on the second reflection layer 523 using a plasma CVD method, and the second bonding layer 532 made of octamethyltrisiloxane is formed. The first step and the second step may be reversed.

Figure 4C:
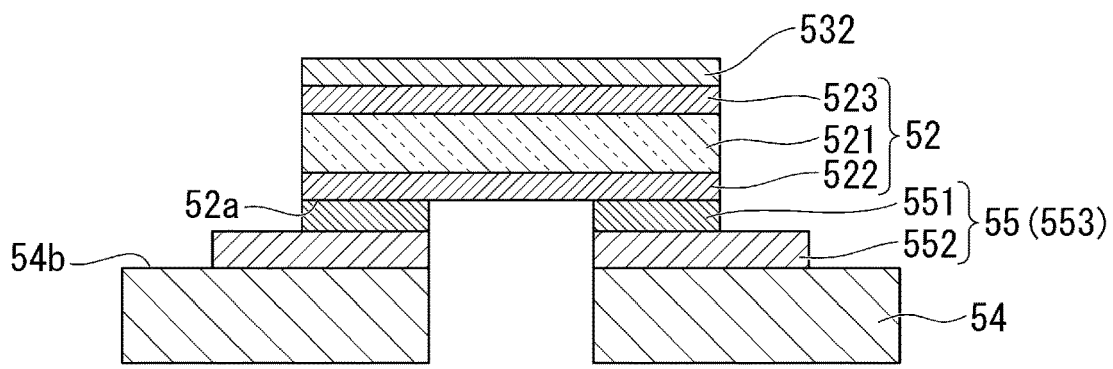
FIG. 4C is a cross-sectional view showing a step subsequent to FIG. 4B.

Next, as shown in FIG. 4C, a paste containing nano-silver particles is coated onto the second surface 54b of the second substrate 54 to form the nano-silver layer 552.

Next, the first substrate 52 on which the silver layer 551 is formed and the second substrate 54 on which the nano-silver layer 552 is formed are bonded to each other. At this time, by facing the first substrate 52 and the second substrate 54 to each other such that the silver layer 551 and the nano-silver layer 552 are in close contact with each other and firing at a temperature of 200° C. to 300° C., the first surface 52a of the first substrate 52 and the second surface 54b of the second substrate 54 are bonded to each other by a third bonding layer 553 (third step). The third bonding layer 553 corresponds to the second intermediate layer 55.

As the third bonding layer 553 for bonding the first substrate 52 and the second substrate 54, a solder may be used instead of the nano-silver layer 552. However, since the thermal conductivity of the solder is 20 W/m·K to 70 W/m·K, while the thermal conductivity of nano-silver is as high as 150 W/m·K to 300 W/m·K, bonding by the nano-silver layer 552 has excellent heat dissipation. Therefore, it is desirable to use the nano-silver layer 552 from the viewpoint of enhancing the heat dissipation.

Figure 4D:
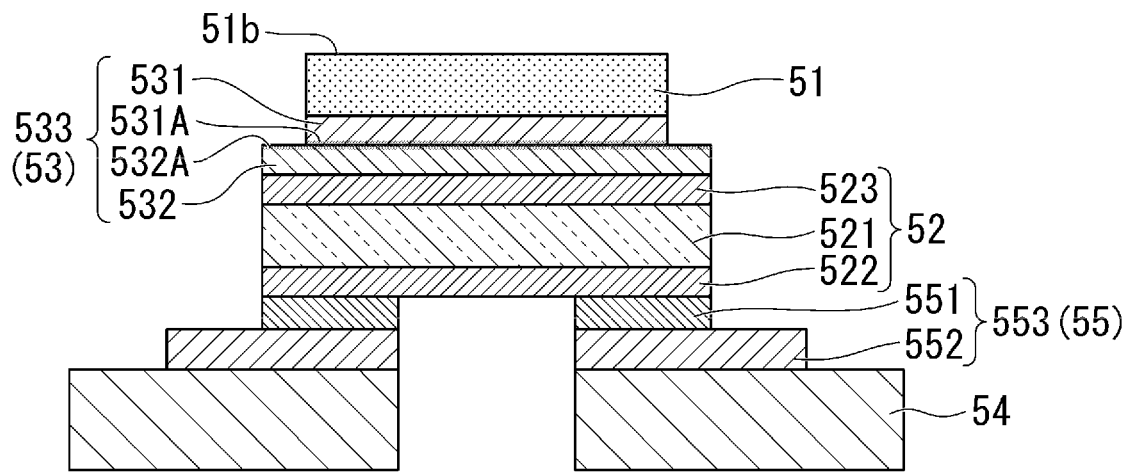
FIG. 4D is a cross-sectional view showing a step subsequent to FIG. 4C.

Next, as shown in FIG. 4D, the first bonding layer 531 and the second bonding layer 532 are bonded to form a fourth bonding layer 533 by using a plasma polymerization method, and the wavelength conversion layer 51 and the first substrate 52 are bonded to each other (fourth step). At this time, before bonding the wavelength conversion layer 51 and the first substrate 52 to each other, energy is applied to the first bonding layer 531 by irradiating the first bonding layer 531 with plasma (fifth step). Accordingly, molecules on a surface of the first bonding layer 531 is activated, and an active layer 531A having a small amount of methyl groups is formed on the surface of the first bonding layer 531. Similarly, energy is applied to the second bonding layer 532 by irradiating the second bonding layer 532 with plasma (sixth step). Accordingly, molecules on a surface of the second bonding layer 532 is activated, and an active layer 532A having a small amount of methyl groups is formed on the surface of the second bonding layer 532. As long as the fifth step is after the first step and before the fourth step, the order of other steps does not matter. Further, as long as the sixth step is after the second step and before the fourth step, the order of other steps does not matter. The fifth step and the sixth step may be performed at the same time.

Then, the first bonding layer 531 and the second bonding layer 532 are brought into close contact with each other, and are pressed and bonded at room temperature. Here, a bond of the active layer 531A of the first bonding layer 531 and a bond of the active layer 532A of the second bonding layer 532 are bonded to each other, and the wavelength conversion layer 51 and the first substrate 52 are bonded to each other by these molecular bonds. Therefore, the first surface 51a of the wavelength conversion layer 51 and the second surface 52b of the first substrate 52 are bonded together by the fourth bonding layer 533. The fourth bonding layer 533 corresponds to the first intermediate layer 53.

The bonding temperature in the third step is 200° C. to 300° C., whereas the bonding temperature in the fourth step is room temperature. That is, the bonding temperature in the third step is higher than the bonding temperature in the fourth step.

That is, the method of manufacturing the wavelength conversion element 23 according to the present embodiment includes: the first step of forming the first bonding layer 531 on the wavelength conversion layer 51; the second step of forming the second bonding layer 532 on the first substrate 52; the third step, which is after the first step and the second step, of bonding, to the second substrate 54 by the third bonding layer 553, any one of a surface of the wavelength conversion layer 51 which is different from a surface on which the first bonding layer 531 is formed and a surface of the first substrate 52 which is different from a surface on which the second bonding layer 532 is formed; and the fourth step, which is after the third step, of bonding the first bonding layer 531 and the second bonding layer 532 to form the fourth bonding layer 533. The linear expansion coefficient of the first substrate 52 is smaller than the linear expansion coefficient of the wavelength conversion layer 51. The linear expansion coefficient of the wavelength conversion layer 51 is smaller than the linear expansion coefficient of the second substrate 54. The linear expansion coefficient of the first substrate 52 is smaller than the linear expansion coefficient of the second substrate 54.

The anti-reflection layer may be formed on the second surface 51b of the wavelength conversion layer 51 before bonding the wavelength conversion layer 51 to the first substrate 52, and may be formed on the second surface 51b of the wavelength conversion layer 51 after bonding the wavelength conversion layer 51 to the first substrate 52.

Effects of First Embodiment

The wavelength conversion element 23 according to the present embodiment includes: the wavelength conversion layer 51 configured to convert the excitation light E in the first wavelength band into the fluorescence Y in the second wavelength band different from the first wavelength band; the first substrate 52; the second substrate 54; the first intermediate layer 53 provided between the wavelength conversion layer 51 and the first substrate 52; and the second intermediate layer 55 provided between the first substrate 52 and the second substrate 54. The linear expansion coefficient of the first substrate 52 is smaller than the linear expansion coefficient of the wavelength conversion layer 51. The linear expansion coefficient of the wavelength conversion layer 51 is smaller than the linear expansion coefficient of the second substrate 54. The linear expansion coefficient of the first substrate 52 is smaller than the linear expansion coefficient of the second substrate 54. The thermal conductivity of the first substrate 52 is larger than the thermal conductivity of the wavelength conversion layer 51. The thermal conductivity of the second substrate 54 is larger than the thermal conductivity of the wavelength conversion layer 51. The thickness of the first intermediate layer 53 is smaller than the thickness of the wavelength conversion layer 51. The thickness of the first intermediate layer 53 is smaller than the thickness of the first substrate 52. The thickness of the first intermediate layer 53 is smaller than the thickness of the second intermediate layer 55.

According to the configuration, since the thermal conductivity of the wavelength conversion layer 51 is smaller than the thermal conductivity of the first substrate 52 and the thermal conductivity of the second substrate 54, the wavelength conversion layer 51 itself hardly dissipates heat generated in the wavelength conversion layer 51. However, since the heat generated in the wavelength conversion layer 51 is likely to be transferred to the first substrate 52 having a thermal conductivity higher than that of the wavelength conversion layer 51 through the first intermediate layer 53, and is more likely to be transferred to the second substrate 54 having a thermal conductivity higher than that of the wavelength conversion layer 51 through the second intermediate layer 55, the heat is quickly dissipated from the first substrate 52 and the second substrate 54. Therefore, even if the linear expansion coefficients of the wavelength conversion layer 51, the first substrate 52, and the second substrate 54 have the above relationship, since the heat generated in the wavelength conversion layer 51 is quickly dissipated, it is possible to prevent the wavelength conversion layer 51 and the first substrate 52 from peeling off due to a linear expansion coefficient difference.

Further, since the thickness of the first intermediate layer 53 is smaller than the thickness of the wavelength conversion layer 51, the thickness of the first substrate 52, and the thickness of the second intermediate layer 55, when the heat of the wavelength conversion layer 51 is transferred to the first substrate 52 through the first intermediate layer 53, the influence on the first intermediate layer 53 can be minimized. Therefore, the heat generated in the wavelength conversion layer 51 is quickly dissipated, and it is possible to prevent the wavelength conversion layer 51 and the first substrate 52 from peeling off due to the linear expansion coefficient difference.

In the wavelength conversion element 23 according to the present embodiment, the Young's modulus of the second intermediate layer 55 made of silver is smaller than the Young's modulus of the first intermediate layer 53 made of octamethyltrisiloxane.

According to the configuration, since the hardness of the second intermediate layer 55 is lower than the hardness of the first intermediate layer 53, thermal stress caused by the linear expansion coefficient difference between the wavelength conversion layer 51 and the second substrate 54 or the linear expansion coefficient difference between the first substrate 52 and the second substrate 54 can be relieved. In particular, in the present embodiment, since the linear expansion coefficient difference between the first substrate 52 and the second substrate 54 is larger than the linear expansion coefficient difference between the wavelength conversion layer 51 and the second substrate 54, when the hardness of the second intermediate layer 55 is lower than the hardness of the first intermediate layer 53, the thermal stress generated in the first substrate 52 and the second substrate 54 can be effectively relieved. Accordingly, a decrease in reliability of the wavelength conversion element 23 can be prevented.

In the wavelength conversion element 23 according to the present embodiment, the area of the wavelength conversion layer 51 is smaller than the area of the first substrate 52.

According to the configuration, since the entire region of the first surface 51a of the wavelength conversion layer 51 faces the first substrate 52 through the first intermediate layer 53, a sufficiently wide heat transfer path can be secured. Accordingly, heat dissipation from the wavelength conversion layer 51 to the first substrate 52 is enhanced, and the thermal stress caused by the linear expansion coefficient difference between the wavelength conversion layer 51 and the first substrate 52 can be relieved.

In the wavelength conversion element 23 according to the present embodiment, the wavelength conversion layer 51 has the first surface 51a and the second surface 51b different from the first surface 51a. The excitation light E in the first wavelength band is incident on the first surface 51a, and the fluorescence Y in the second wavelength band is emitted from the second surface 51b.

The above configuration is a so-called transmission type wavelength conversion element. According to the wavelength conversion element 23 according to the present embodiment, even a transmission type wavelength conversion element which is generally difficult to dissipate heat from the wavelength conversion layer can efficiently dissipate the heat generated by the wavelength conversion layer 51, and it is possible to prevent a decrease in the reliability of the wavelength conversion element 23.

The first light source device 11 according to the present embodiment includes the wavelength conversion element 23 and the light emitting elements 20a1 that emit the excitation light E in the first wavelength band to the wavelength conversion element 23.

According to the configuration, the first light source device 11 having excellent reliability can be implemented.

The projector 1 according to the present embodiment includes the first light source device 11, the light modulation devices 4B, 4G, and 4R configured to modulate the light from the first light source device 11 according to the image information, and the projection optical device 6 configured to project the light modulated by the light modulation devices 4B, 4G, and 4R.

According to the configuration, the projector 1 having excellent reliability can be implemented.

The method of manufacturing the wavelength conversion element 23 according to the present embodiment includes: the first step of forming the first bonding layer 531 on the wavelength conversion layer 51; the second step of forming the second bonding layer 532 on the first substrate 52; the third step, which is after the first step and the second step, of bonding, to the second substrate 54 by the third bonding layer 553, any one of a second surface 531b of the wavelength conversion layer 51 which is different from a first surface 531a on which the first bonding layer 531 is formed and the first surface 52a of the first substrate 52 which is different from the second surface 52b on which the second bonding layer 532 is formed; and the fourth step, which is after the third step, of bonding the first bonding layer 531 and the second bonding layer 532 to form the fourth bonding layer 533. The linear expansion coefficient of the first substrate 52 is smaller than the linear expansion coefficient of the wavelength conversion layer 51. The linear expansion coefficient of the wavelength conversion layer 51 is smaller than the linear expansion coefficient of the second substrate 54. The linear expansion coefficient of the first substrate 52 is smaller than the linear expansion coefficient of the second substrate 54.

The linear expansion coefficient of the first substrate 52 and the linear expansion coefficient of the wavelength conversion layer 51 are different. When the bonding is performed by the third bonding layer 553, that is, when heating is required in the third step, if the first substrate 52 and the wavelength conversion layer 51 are bonded by the first bonding layer 531 and the second bonding layer 532 before performing the bonding by the third bonding layer 553, the first substrate 52 and the wavelength conversion layer 51 may be peeled off due to the linear expansion coefficient difference between the first substrate 52 and the wavelength conversion layer 51. In contrast, according to the method of manufacturing the wavelength conversion element 23 according to the present embodiment, since the first substrate 52 and the wavelength conversion layer 51 are bonded by the first bonding layer 531 and the second bonding layer 532 after performing the bonding by the third bonding layer 553, even when the linear expansion coefficient of the first substrate 52 and the linear expansion coefficient of the wavelength conversion layer 51 are different, it is possible to prevent the first substrate 52 and the wavelength conversion layer 51 from peeling off. Accordingly, the wavelength conversion element 23 having the above effects is obtained.

In the method of manufacturing the wavelength conversion element 23 according to the present embodiment, the bonding temperature in the third step is higher than the bonding temperature in the fourth step.

According to the configuration, since the bonding in the third step is performed at a relatively high bonding temperature and then the bonding in the fourth step is performed at a relatively low bonding temperature, no large thermal stress is applied to the fourth bonding layer 533 through which the first bonding layer 531 and the second bonding layer 532 are bonded to each other, and the above effects of preventing the peeling off between the first substrate 52 and the wavelength conversion layer 51 can be further enhanced.

The method of manufacturing the wavelength conversion element 23 according to the present embodiment further includes: a fifth step of applying energy to the first bonding layer 531; and a sixth step of applying energy to the second bonding layer 532. The fourth step is after the fifth step and the sixth step, and is to press and bond the first bonding layer 531 and the second bonding layer 532 to each other.

According to the configuration, since the bonding temperature in the fourth step can be set to room temperature, no thermal stress is generated during bonding in the fourth step, and the peeling off between the first substrate 52 and the wavelength conversion layer 51 can be reliably prevented.

Second Embodiment

A second embodiment according to the present disclosure will be described below with reference to FIG. 5 and FIGS. 6A to 6E.

The configurations of a projector and an illumination device according to the second embodiment is similar to those of the first embodiment, whereas the configuration of a wavelength conversion element is different from that of the first embodiment. Therefore, a description of the entire projector and the illumination device is omitted.

Figure 5:
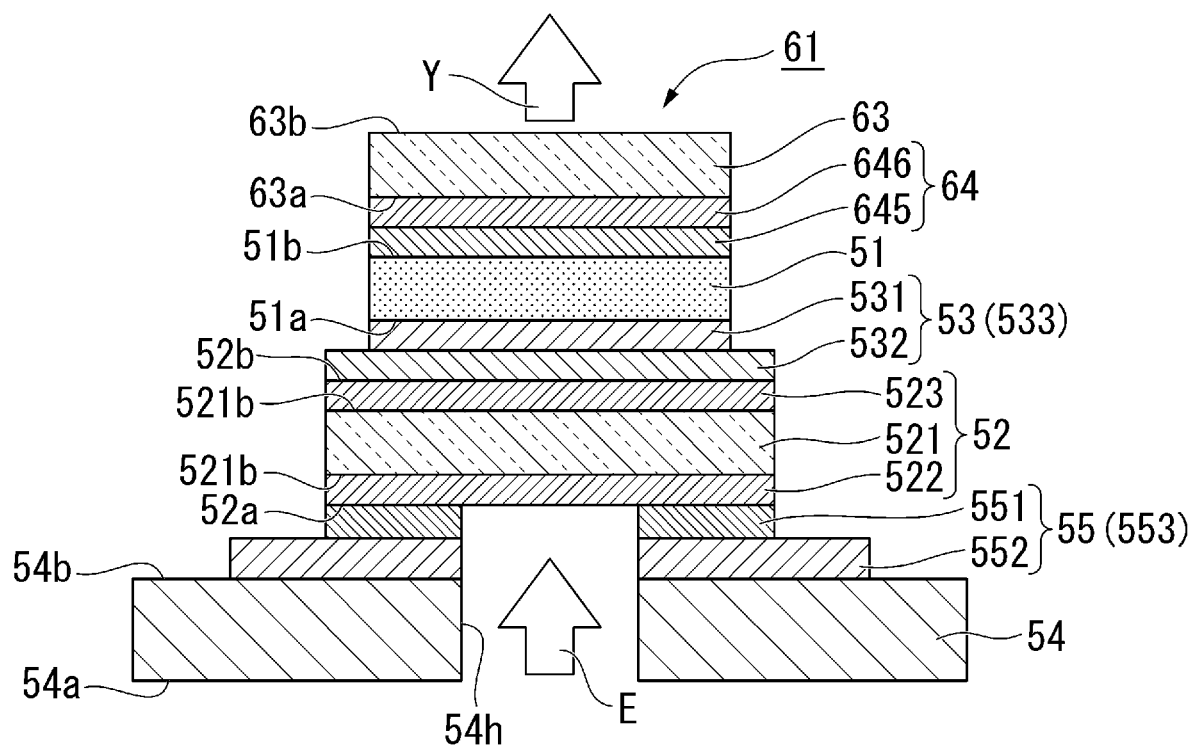
FIG. 5 is a cross-sectional view of a wavelength conversion element according to a second embodiment.

FIG. 5 is a cross-sectional view of a wavelength conversion element 61 according the second embodiment.

In FIG. 5, the same components as those in the drawings used in the first embodiment are denoted by the same reference numerals, and the description thereof is omitted.

As shown in FIG. 5, the wavelength conversion element 61 includes the wavelength conversion layer 51, the first substrate 52, the first intermediate layer 53, the second substrate 54, the second intermediate layer 55, a third substrate 63, and a third intermediate layer 64. The second substrate 54, the second intermediate layer 55, the first substrate 52, the first intermediate layer 53, the wavelength conversion layer 51, the third intermediate layer 64, and the third substrate 63 are stacked in this order from a side where excitation light E is incident.

The third substrate 63 is provided to face the second surface 51b of the wavelength conversion layer 51. Similar to the first substrate 52, the third substrate 63 is constituted by a ceramic heat dissipation substrate. The third substrate 63 has a first surface 63a on which fluorescence Y is incident and a second surface 63b from which the fluorescence Y is emitted, which is a surface different from the first surface 63a. The ceramic heat dissipation substrate is made of, for example, a ceramic material such as silicon carbide (SiC). The third substrate 63 may be constituted by a substrate made of a material different from the material of the first substrate 52.

A linear expansion coefficient of SiC constituting the third substrate 63 is 4 to $5 \times 10^{-6}/°$ C. A thermal conductivity of the SiC constituting the third substrate 63 is 300 W/mm·K to 500 W/mm·K. A thickness of the third substrate 63 is 0.05 mm to 0.5 mm, for example, 0.1 mm. Therefore, the linear expansion coefficient of the third substrate 63 is smaller than the linear expansion coefficient of the wavelength conversion layer 51. The linear expansion coefficient of the third substrate 63 is smaller than the linear expansion coefficient of the second substrate 54. The thermal conductivity of the third substrate 63 is larger than the thermal conductivity of the wavelength conversion layer 51.

The third intermediate layer 64 is provided between the third substrate 63 and the wavelength conversion layer 51. The third intermediate layer 64 includes a fifth bonding layer 645 provided on the second surface 51b of the wavelength conversion layer 51 and a sixth bonding layer 646 provided on the first surface 63a of the third substrate 63. Each of the fifth bonding layer 645 and the sixth bonding layer 646 is constituted by a siloxane compound having high light transmittance. In the present embodiment, each of the fifth bonding layer 645 and the sixth bonding layer 646 is formed of octamethyltrisiloxane.

A thermal conductivity of octamethyltrisiloxane constituting the third intermediate layer 64 is 0.2 W/mm·K. A Young's modulus of octamethyltrisiloxane constituting the third intermediate layer 64 is 72 GPa when considered to be equivalent to the Young's modulus of silicon oxide. A thickness of the third intermediate layer 64 is 0.2 μm to 1 μm. Therefore, the thickness of the third intermediate layer 64 is smaller than the thickness of the wavelength conversion layer 51. The thickness of the third intermediate layer 64 is smaller than the thickness of the first substrate 52. The thickness of the third intermediate layer 64 is smaller than the thickness of the second intermediate layer 55. The Young's modulus of the second intermediate layer 55 is smaller than the Young's modulus of the third intermediate layer 64.

An anti-reflection layer may be provided on the second surface 63b of the third substrate 63.

Other configurations of the wavelength conversion element 61 are the same as those of the wavelength conversion element 23 according to the first embodiment.

A method of manufacturing the wavelength conversion element 61 according to the present embodiment will be described below.

FIGS. 6A to 6E are cross-sectional views showing the method of manufacturing the wavelength conversion element according to the present embodiment in order of steps.

Figure 6A:
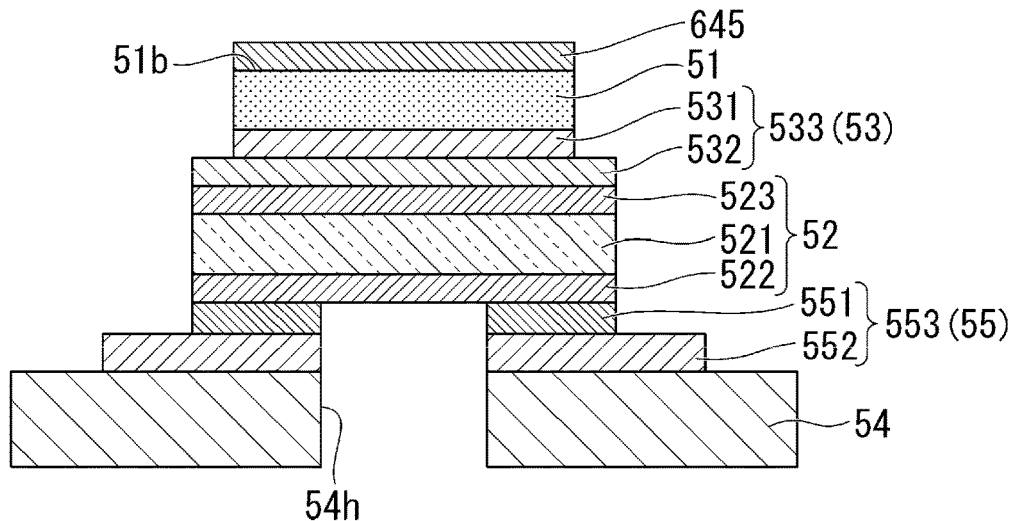
FIG. 6A is a cross-sectional view showing a method of manufacturing the wavelength conversion element according to the second embodiment.

As shown in FIG. 6A, by the same procedure as in the first embodiment, the first substrate 52 and the second substrate 54 are bonded to each other by the third bonding layer 553, and then the first substrate 52 and the wavelength conversion layer 51 are bonded to each other by the fourth bonding layer 533. Next, the fifth bonding layer 645 is formed on the second surface 51b of the wavelength conversion layer 51. At this time, an octamethyltrisiloxane film is formed on the second surface 51b of the wavelength conversion layer 51 using a plasma CVD method, and the fifth bonding layer 645 made of octamethyltrisiloxane is formed.

Figure 6B:
FIG. 6B is a cross-sectional view showing a step subsequent to FIG. 6A.

Next, as shown in FIG. 6B, the sixth bonding layer 646 is formed on the first surface 63a of the third substrate 63. At this time, an octamethyltrisiloxane film is formed on the first surface 63a of the third substrate 63 using a plasma CVD method, and the sixth bonding layer 646 made of octamethyltrisiloxane is formed.

Figure 6C:
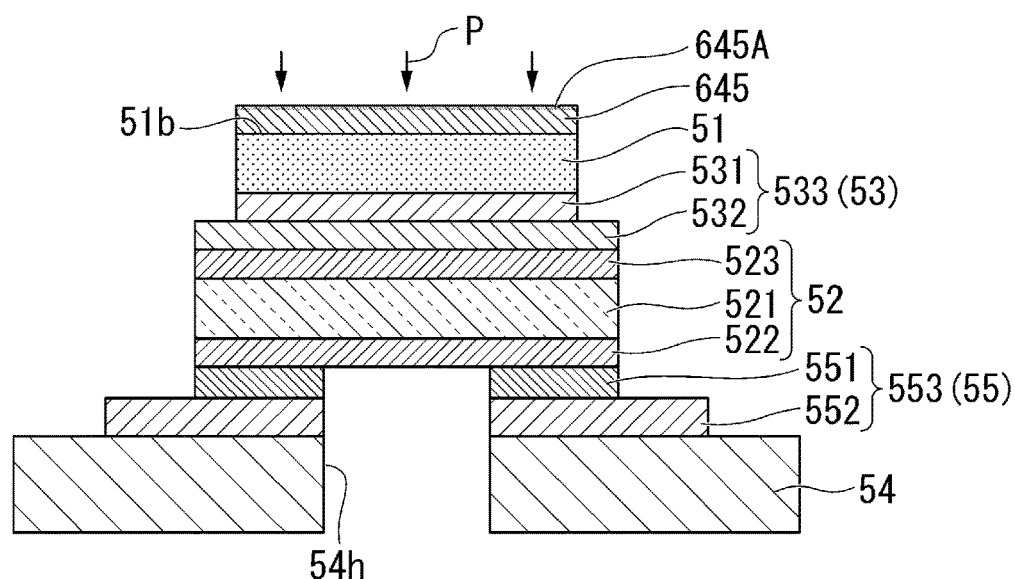
FIG. 6C is a cross-sectional view showing a step subsequent to FIG. 6B.

Next, as shown in FIG. 6C, the fifth bonding layer 645 formed on the second surface 51b of the wavelength conversion layer 51 is irradiated with plasma P to apply energy thereto. Accordingly, an active layer 645A having a small amount of methyl groups is formed on the fifth bonding layer 645, and the fifth bonding layer 645 exhibits adhesiveness.

Figure 6D:
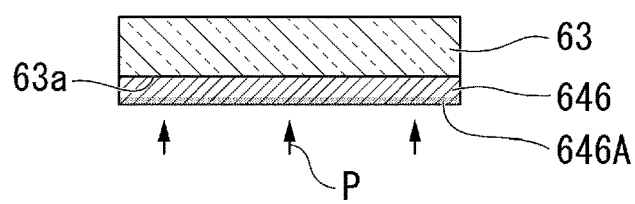
FIG. 6D is a cross-sectional view showing a step subsequent to FIG. 6C.

Next, as shown in FIG. 6D, the sixth bonding layer 646 formed on the first surface 63a of the third substrate 63 is irradiated with the plasma P to apply energy thereto. Accordingly, an active layer 646A having a small amount of methyl groups is formed on the sixth bonding layer 646, and the sixth bonding layer 646 exhibits adhesiveness.

Figure 6E:
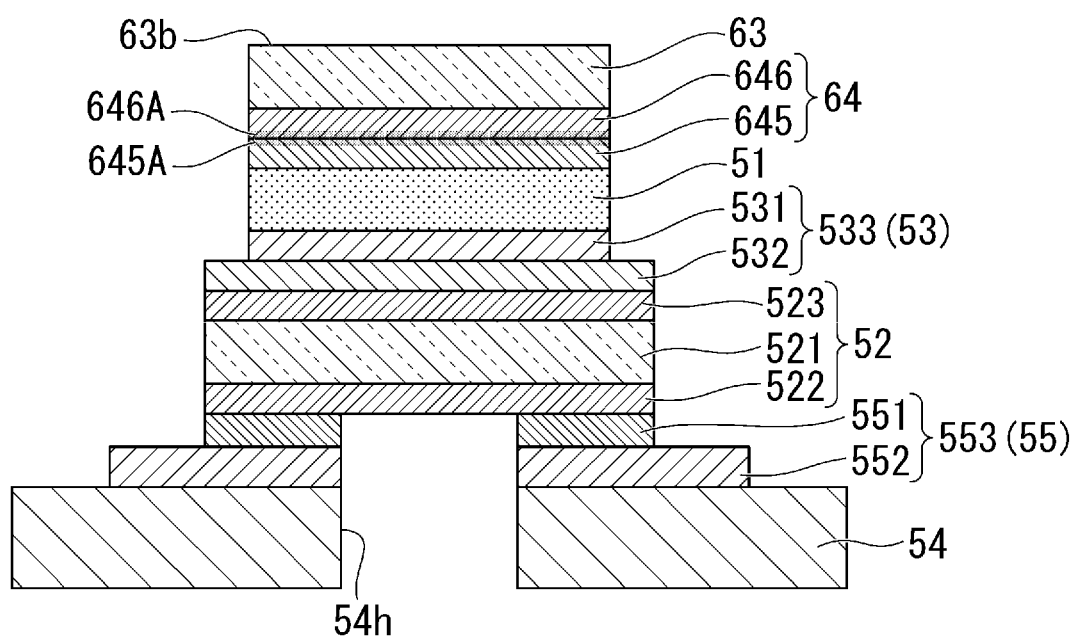
FIG. 6E is a cross-sectional view showing a step subsequent to FIG. 6D.

Next, as shown in FIG. 6E, the fifth bonding layer 645 and the sixth bonding layer 646 are bonded to form the third intermediate layer 64 by using a plasma polymerization method, and the wavelength conversion layer 51 and the third substrate 63 are bonded to each other. As described above, when the energy is applied to the fifth bonding layer 645 and the sixth bonding layer 646, the active layers 645A and 646A are formed on surfaces of the fifth bonding layer 645 and the sixth bonding layer 646. Then, the fifth bonding layer 645 and the sixth bonding layer 646 are brought into close contact with each other, and are pressed and bonded at a room temperature. At this time, a bond of the active layer 645A of the fifth bonding layer 645 and a bond of the active layer 646A of the sixth bonding layer 646 are bonded to each other, and the wavelength conversion layer 51 and the third substrate 63 are bonded by these molecular bonds.

The anti-reflection layer may be formed on the second surface 63b of the third substrate 63 before bonding the wavelength conversion layer 51 and the third substrate 63 to each other, and may be formed on the second surface 63b of the third substrate 63 after bonding the wavelength conversion layer 51 and the third substrate 63 to each other.

Effects of Second Embodiment

Also in the present embodiment, the heat generated in the wavelength conversion layer 51 is quickly dissipated, and effects similar to those in the first embodiment can be obtained, such as preventing peeling off between the wavelength conversion layer 51 and the first substrate 52 due to the linear expansion coefficient difference.

The wavelength conversion element 61 according to the present embodiment further includes: the third substrate 63 having the linear expansion coefficient smaller than the linear expansion coefficient of the second substrate 54; and the third intermediate layer 64 provided between the wavelength conversion layer 51 and the third substrate 63. The linear expansion coefficient of the third substrate 63 is smaller than the linear expansion coefficient of the wavelength conversion layer 51. The linear expansion coefficient of the third substrate 63 is smaller than the linear expansion coefficient of the second substrate 54. The thermal conductivity of the third substrate 63 is larger than the thermal conductivity of the wavelength conversion layer 51. The thickness of the third intermediate layer 64 is smaller than the thickness of the wavelength conversion layer 51. The thickness of the third intermediate layer 64 is smaller than the thickness of the first substrate 52. The thickness of the third intermediate layer 64 is smaller than the thickness of the second intermediate layer 55.

According to the configuration according to the present embodiment, in addition to being transferred to the first substrate 52, the heat generated in the wavelength conversion layer 51 is transferred to the third substrate 63 having a thermal conductivity higher than that of the wavelength conversion layer 51 through the third intermediate layer 64, and is dissipated from the third substrate 63. Accordingly, the heat generated in the wavelength conversion layer 51 is transmitted from both the first surface 51a and the second surface 51b and is quickly dissipated. Accordingly, it is possible to prevent the peeling off between the wavelength conversion layer 51 and the first substrate 52 due to the linear expansion coefficient difference, and it is possible to prevent the peeling off between the wavelength conversion layer 51 and the third substrate 63.

Third Embodiment

Hereinafter, a third embodiment according to the present disclosure will be described with reference to FIGS. 7 and 8 and FIGS. 9A to 9B.

The configuration of a projector according to the third embodiment is similar to that of the first embodiment, whereas the configurations of an illumination device and a wavelength conversion element are different from those of the first embodiment. Therefore, a description of the entire projector is omitted.

Figure 7:
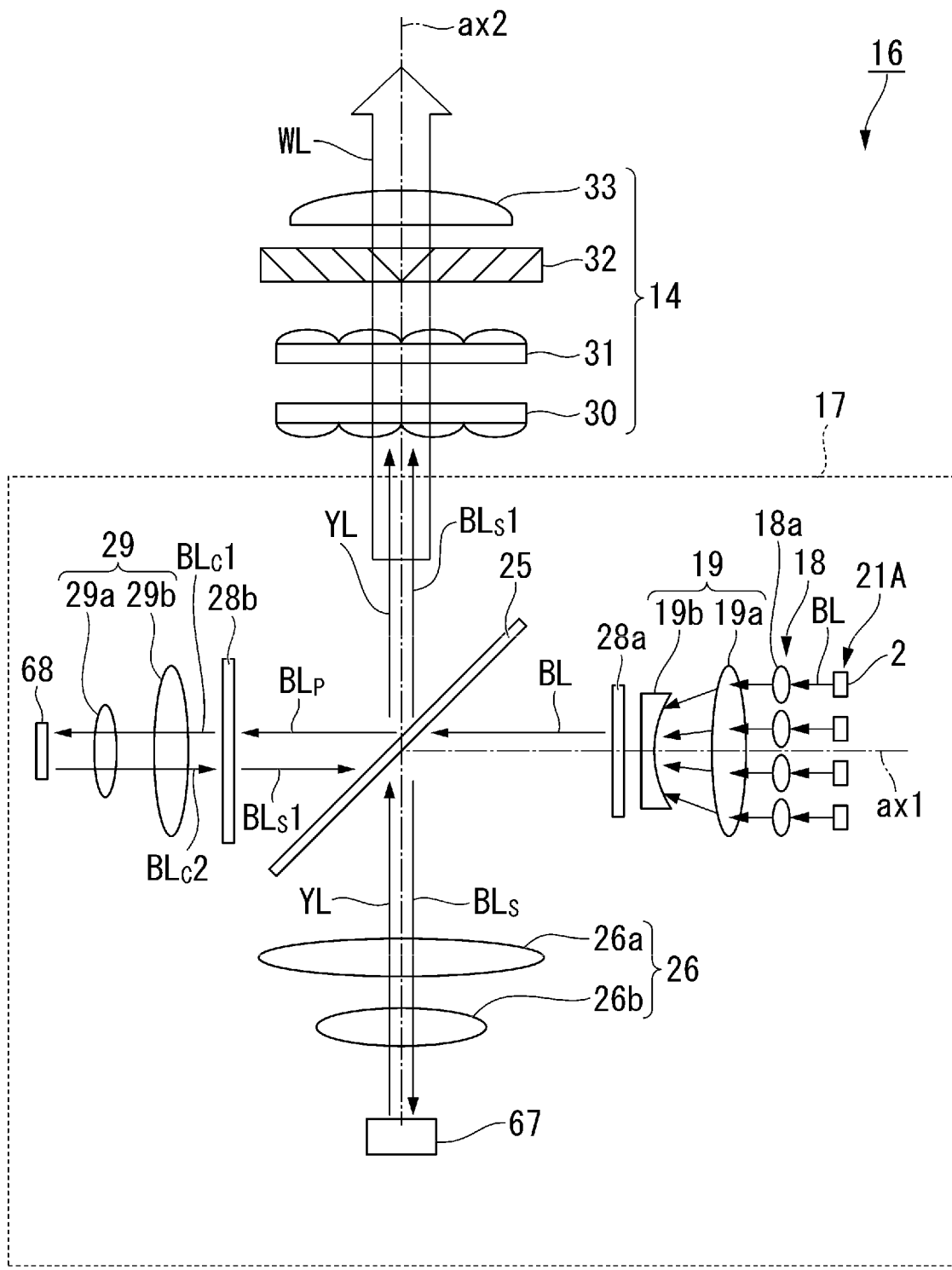
FIG. 7 is a schematic configuration diagram of an illumination device according to a third embodiment.

FIG. 7 is a schematic configuration diagram of an illumination device according to the third embodiment.

In FIG. 7, the same components as those in the drawings used in the first embodiment are denoted by the same reference numerals, and the description thereof is omitted.

As shown in FIG. 7, an illumination device 16 includes a light source device 17 and the uniform illumination unit 14.

The light source device 17 includes an array light source 21A, a collimator optical system 18, an afocal optical system 19, a first retardation plate 28a, a polarization separation element 25, a first condensing optical system 26, a wavelength conversion element 67, a second retardation plate 28b, a second condensing optical system 29, and a diffusion reflection element 68.

The array light source 21A, the collimator optical system 18, the afocal optical system 19, the first retardation plate 28a, the polarization separation element 25, the second retardation plate 28b, the second condensing optical system 29, and the diffusion reflection element 68 are arranged side by side along an optical axis ax1. On the other hand, the wavelength conversion element 67, the first condensing optical system 26, the polarization separation element 25, the first lens array 30, the second lens array 31, the polarization conversion element 32, and the superimposing lens 33 are arranged side by side along an illumination optical axis ax2. The optical axis ax1 and the illumination optical axis ax2 are in the same plane and are orthogonal to each other.

The array light source 21A includes a plurality of light emitting elements 20a1. The plurality of light emitting elements 20a1 are arranged in an array in a plane orthogonal to the optical axis ax1. The light emitting element 20a1 emits blue light BL having a peak wavelength of, for example, 445 nm. The array light source 21A emits a light beam formed of a plurality of light BL.

The light BL emitted from the array light source 21A is incident on the collimator optical system 18. The collimator optical system 18 converts the light BL emitted from the array light source 21A into parallel light. The collimator optical system 18 includes, for example, a plurality of collimator lenses 18a arranged in an array. The plurality of collimator lenses 18a are arranged corresponding to the plurality of light emitting elements 20a1.

The light BL passing through the collimator optical system 18 is incident on the afocal optical system 19. The afocal optical system 19 adjusts a light beam diameter of the light BL. The afocal optical system 19 includes, for example, a convex lens 19a and a concave lens 19b.

The light BL passing through the afocal optical system 19 is incident on the first retardation plate 28a. The first retardation plate 28a is, for example, a rotatable half wavelength plate. The light BL emitted from the light emitting elements 20a1 is linearly polarized light. By appropriately setting a rotation angle of the first retardation plate 28a, the light BL transmitted through the first retardation plate 28a can be light including, in a predetermined ratio, an S-polarized component and a P-polarized component with respect to the polarization separation element 25. By rotating the first retardation plate 28a, the ratio of the S-polarized component and the P-polarized component can be changed.

The light BL including the S-polarized component and the P-polarized component generated by passing through the first retardation plate 28a is incident on the polarization separation element 25. The polarization separation element 25 is formed of, for example, a polarization beam splitter having wavelength selectivity. The polarization separation element 25 forms an angle of 45° with respect to the optical axis ax1 and the illumination optical axis ax2.

The polarization separation element 25 has a polarization separation function of separating the light BL into S-polarized component light BLs and P-polarized component light BLp with respect to the polarization separation element 25. Specifically, the polarization separation element 25 reflects the S-polarized component BLs and transmits the P-polarized component BLp. Further, the polarization separation element 25 has a color separation function of transmitting fluorescence YL in a wavelength band different from that of the light BL, regardless of a polarization state.

The S-polarized light BLs emitted from the polarization separation element 25 is incident on the first condensing optical system 26. The first condensing optical system 26 condenses the light BLs toward the wavelength conversion element 67.

In the present embodiment, the first condensing optical system 26 includes, for example, a first lens 26a and a second lens 26b. The light BLs emitted from the first condensing optical system 26 is incident on the wavelength conversion element 67 in a condensed state.

The fluorescence YL generated by the wavelength conversion element 67 is parallelized by the first condensing optical system 26 and then is incident on the polarization separation element 25. The fluorescence YL is transmitted through the polarization separation element 25.

On the other hand, the P-polarized light BLp transmitted through the polarization separation element 25 is incident on the second retardation plate 28b. The second retardation plate 28b is constituted by a quarter wavelength plate arranged in an optical path between the polarization separation element 25 and the diffusion reflection element 68. Therefore, the P-polarized light BLp emitted from the polarization separation element 25 is converted into, for example, clockwise circularly polarized blue light BLc1 by the second retardation plate 28b, and then is incident on the second condensing optical system 29.

The second condensing optical system 29 includes, for example, a first convex lens 29a and a second convex lens 29b. The second condensing optical system 29 causes the blue light BLc1 to be incident on the diffusion reflection element 68 in a condensed state.

The diffusion reflection element 68 is arranged on a side different from the wavelength conversion element 67 with respect to the polarization separation element 25. The diffusion reflection element 68 diffusely reflects the blue light BLc1 emitted from the second condensing optical system 29 toward the polarization separation element 25. It is preferable to use a diffusion reflection element that reflects the blue light BLc1 with a distribution close to Lambert diffusion and does not disturb the polarization state as the diffusion reflection element 68.

Hereinafter, the light diffusely reflected by the diffusion reflection element 68 is referred to as blue light BLc2. According to the present embodiment, the blue light BLc2 having a substantially uniform illuminance distribution is obtained by diffusely reflecting the blue light BLc1. For example, the clockwise circularly polarized blue light BLc1 is reflected by the diffusion reflection element 68 to be counterclockwise circularly polarized blue light BLc2.

The blue light BLc2 is converted into parallel light by the second condensing optical system 29, and then is incident on the second retardation plate 28b again. The counterclockwise circularly polarized blue light BLc2 is converted into the S-polarized blue light BLs1 by the second retardation plate 28b. The S-polarized blue light BLs1 is reflected toward the first lens array 30 by the polarization separation element 25.

Accordingly, the blue light BLs1, together with the fluorescence YL transmitted through the polarization separation element 25, is used as illumination light WL. That is, the blue light BLs1 and the fluorescence YL are emitted from the polarization separation element 25 in the same direction, thereby generating white illumination light WL in which the blue light BLs1 and the yellow fluorescence YL are mixed.

The other configuration of the illumination device 16 is common to the illumination device 2 according to the first embodiment.

Figure 8:
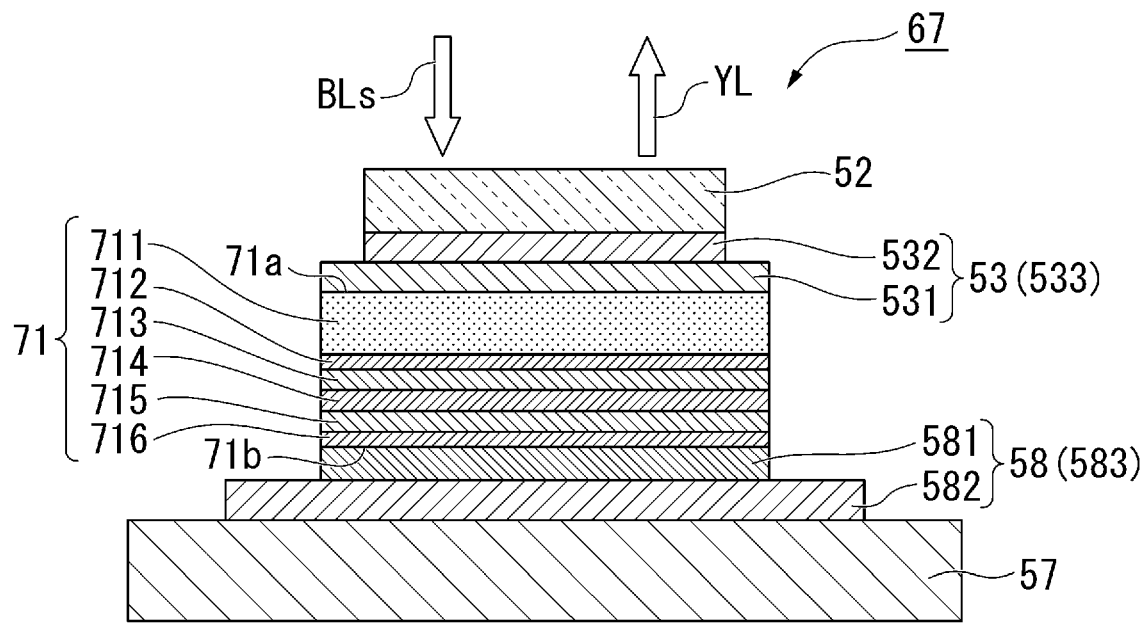
FIG. 8 is a cross-sectional view of a wavelength conversion element according to the third embodiment.

FIG. 8 is a cross-sectional view of the wavelength conversion element 67 according to the present embodiment.

In FIG. 8, the same components as those in the drawings used in the first embodiment are denoted by the same reference numerals, and the description thereof is omitted.

As shown in FIG. 8, the wavelength conversion element includes a wavelength conversion layer 71, the first substrate 52, the first intermediate layer 53, a second substrate 57, and a second intermediate layer 58. The first substrate 52, the first intermediate layer 53, the wavelength conversion layer 71, the second intermediate layer 58, and the second substrate 57 are stacked in this order from a side where the light BLs is incident. The wavelength conversion elements 23 and 61 according to the first and second embodiments are transmission type wavelength conversion elements, whereas the wavelength conversion element 67 according to the present embodiment is a reflection type wavelength conversion element.

The wavelength conversion layer 71 includes a fluorescent body layer 711, a total reflection layer 712, a reflection-enhancing layer 713, a first deterioration prevention layer 714, a reflection layer 715, and a second deterioration prevention layer 716, which are stacked in this order from the side where the light BLs is incident. The fluorescent body layer 711 has the same configuration as the wavelength conversion layer 51 according to the first embodiment. The wavelength conversion layer 71 has a first surface 71a on which the light BLs is incident and from which the fluorescence YL is emitted, and a second surface 71b different from the first surface 71a.

The total reflection layer 712 has a first silicon oxide film ($SiO_2$) and a second silicon oxide film ($SiO_2$). The reflection-enhancing layer 713 is constituted by a stacked layer film including a niobium oxide film ($Nb_2O_5$), a silicon oxide film ($SiO_2$), a niobium oxide film ($Nb_2O_5$), and an aluminum oxide film ($Al_2O_3$). The first deterioration prevention layer 714 is constituted by tin oxide ($SnO_2$). The reflection layer 715 is constituted by a silver film (Ag). The second deterioration prevention layer 716 is constituted by tin oxide ($SnO_2$). A diffusion protection layer made of, for example, nickel (Ni) may be formed between the reflection layer 715 and the second deterioration prevention layer 716.

The first substrate 52 is arranged to face the first surface 71a of the wavelength conversion layer 71. The first substrate 52 is constituted by a ceramic heat dissipation substrate. The ceramic heat dissipation substrate is made of, for example, SiC. The first substrate 52 and the wavelength conversion layer 71 are bonded to each other through the first intermediate layer 53. As in the first embodiment, the first intermediate layer 53 includes the first bonding layer 531 and the second bonding layer 532. Each of the first bonding layer 531 and the second bonding layer 532 is formed of, for example, a siloxane compound such as octamethyltrisiloxane. Therefore, as in the first embodiment, the first intermediate layer 53 corresponds to the fourth bonding layer 533.

The second substrate 57 is arranged to face the second surface 71b of the wavelength conversion layer 71. The second substrate 57 is constituted by a metal heat dissipation substrate. The metal heat dissipation substrate is made of, for example, Cu. The second substrate 57 and the wavelength conversion layer 71 are bonded to each other through the second intermediate layer 58. As in the first embodiment, the second intermediate layer 58 includes a silver layer 581 and a nano-silver layer 582. Therefore, as in the first embodiment, the second intermediate layer 58 corresponds to a third bonding layer 583.

A method of manufacturing the wavelength conversion element 67 according to the present embodiment will be described below.

Figure 9A:
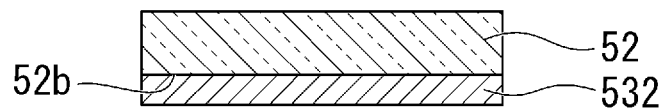
FIG. 9A is a cross-sectional view showing a method of manufacturing the wavelength conversion element according to the third embodiment.
Figure 9B:
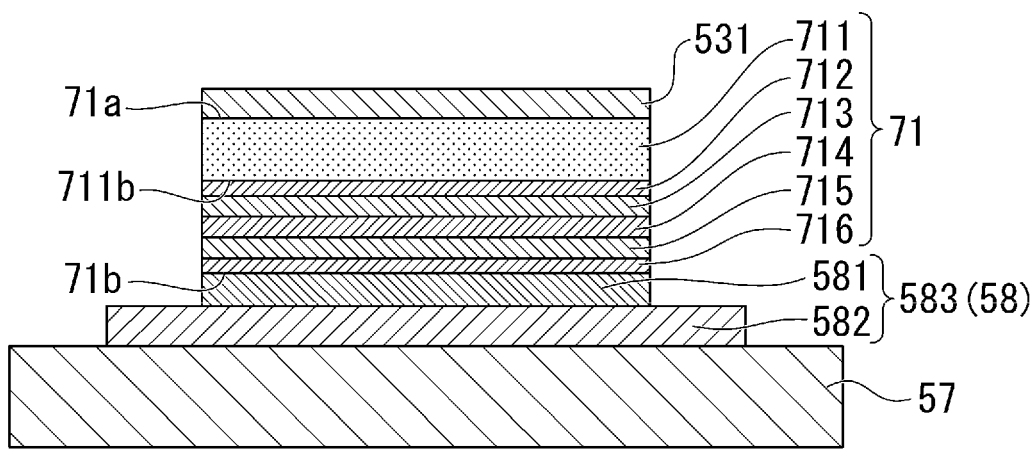
FIG. 9B is a cross-sectional view showing a step subsequent to FIG. 9A.

FIGS. 9A and 9B are cross-sectional views showing the method of manufacturing the wavelength conversion element 67 according to the present embodiment in order of steps.

As shown in FIG. 9A, the second bonding layer 532 is formed on the second surface 52b of the first substrate 52. At this time, an octamethyltrisiloxane film is formed on the second surface 52b of the first substrate 52 using a plasma CVD method, and the second bonding layer 532 made of octamethyltrisiloxane is formed.

Next, as shown in FIG. 9B, the wavelength conversion layer 71 is produced, and then the wavelength conversion layer 71 and the second substrate 57 are bonded to each other by the third bonding layer 583. When producing the wavelength conversion layer 71, a first silicon oxide film is formed on a second surface 711b of the fluorescent body layer 711 by a liquid phase method using a raw material containing polysilazane, and then a second silicon oxide film is formed by a vapor deposition method to form the total reflection layer 712. Next, a niobium oxide film, a silicon oxide film, a niobium oxide film, and a aluminum oxide film are sequentially formed by a vapor deposition method to form the reflection-enhancing layer 713. Next, a tin oxide film is formed by a vapor deposition method to form the first deterioration prevention layer 714. Next, a silver film is formed by a vapor deposition method to form the reflection layer 715. Next, a tin oxide film is formed by a vapor deposition method to form the second deterioration prevention layer 716.

When bonding the wavelength conversion layer 71 and the second substrate 57 to each other, as in the first embodiment, the wavelength conversion layer 71 on which the silver layer 581 is formed and the second substrate 57 on which the nano-silver layer 582 is formed are bonded to each other. At this time, by facing the wavelength conversion layer 71 to the second substrate 57 such that the silver layer 581 and the nano-silver layer 582 are in close contact with each other and firing at a temperature of 200° C. to 300° C., the second surface 71b of the wavelength conversion layer 71 and the second substrate 57 are bonded to each other by the third bonding layer 583.

Next, the first bonding layer 531 is formed on the first surface 71a of the wavelength conversion layer 71 by the same method as in the first embodiment. Specifically, an octamethyltrisiloxane film is formed on the first surface 71a of the wavelength conversion layer 71 using a plasma CVD method, and the first bonding layer 531 made of octamethyltrisiloxane is formed.

Next, the wavelength conversion layer 71 and the first substrate 52 are bonded to each other by the same method as in the first embodiment. That is, plasma is applied to each of the first bonding layer 531 and the second bonding layer 532 to activate the surfaces of the first bonding layer 531 and the second bonding layer 532. At this time, active layers having a small amount of methyl groups are formed on the surfaces of the first bonding layer 531 and the second bonding layer 532. Then, the first bonding layer 531 and the second bonding layer 532 are brought into close contact with each other, and are pressed and bonded at a room temperature. At this time, a bond of the active layer of the first bonding layer 531 and a bond of the active layer of the second bonding layer 532 are bonded to each other, and the wavelength conversion layer 71 and the first substrate 52 are bonded each other by these molecular bonds.

Effects of Third Embodiment

Also in the present embodiment, the heat generated in the wavelength conversion layer 71 is quickly dissipated by the first substrate 52 and the second substrate 57, and effects similar to those in the first embodiment can be obtained, such as preventing the peeling off between the wavelength conversion layer 71 and the first substrate 52 due to the linear expansion coefficient difference.

The technical scope of the present disclosure is not limited to the above-described embodiments, and various modifications can be added without departing from the spirit of the present disclosure.

For example, in the first embodiment, as the first substrate 52, the first reflection layer 522 is provided on the first surface 521a of the ceramic heat dissipation substrate 521, and the second reflection layer 523 is provided on the second surface 521b of the ceramic heat dissipation substrate 521. The first reflection layer 522 and the second reflection layer 523 have a characteristic of transmitting the excitation light E and reflecting the fluorescence Y. In the configuration, an anti-reflection film for preventing reflection of the excitation light E in the first wavelength band may be provided instead of the second reflection layer 523.

In addition to the plasma polymerization method used in the above embodiments, the bonding method between the first bonding layer 531 and the second bonding layer 532 may be an atomic diffusion bonding method.

In the third embodiment, an example of the fixed type wavelength conversion element 67 which is not rotatable is described. The present disclosure can also be applied to a light source device having a wavelength conversion element that is rotatable by a motor.

In addition, a specific description of the shape, number, arrangement, material, and the like of each component of the light source device, the illumination device, and the projector is not limited to the above embodiments, and can be appropriately changed. In the above embodiments, the light source device according to the present disclosure is mounted on a projector using a liquid crystal light valve, and the present disclosure is not limited thereto. The light source device according to the present disclosure may be mounted on a projector using a digital micromirror device as a light modulation device. In addition, the projector may not include a plurality of light modulation devices, and may include only one light modulation device.

In the above embodiments, an example in which the light source device according to the present disclosure is mounted on a projector is shown, and the present disclosure is not limited thereto. The light source device according to the present disclosure can also be applied to a luminaire, a headlight of an automobile, and the like.

A wavelength conversion element according to an aspect of the present disclosure may have the following configuration.

The wavelength conversion element according to the aspect of the present disclosure includes: a wavelength conversion layer configured to convert light in a first wavelength band into light in a second wavelength band different from the first wavelength band; a first substrate; a second substrate; a first intermediate layer provided between the wavelength conversion layer and the first substrate; and a second intermediate layer provided between the second substrate and any one of the wavelength conversion layer and the first substrate. A linear expansion coefficient of the first substrate is smaller than a linear expansion coefficient of the wavelength conversion layer. The linear expansion coefficient of the wavelength conversion layer is smaller than a linear expansion coefficient of the second substrate. The linear expansion coefficient of the first substrate is smaller than the linear expansion coefficient of the second substrate. A thermal conductivity of the first substrate is larger than a thermal conductivity of the wavelength conversion layer. A thermal conductivity of the second substrate is larger than the thermal conductivity of the wavelength conversion layer. A thickness of the first intermediate layer is smaller than a thickness of the wavelength conversion layer. The thickness of the first intermediate layer is smaller than a thickness of the first substrate. The thickness of the first intermediate layer is smaller than a thickness of the second intermediate layer.

In the wavelength conversion element according to the aspect of the present disclosure, a Young's modulus of the second intermediate layer may be smaller than a Young's modulus of the first intermediate layer.

The wavelength conversion element according to the aspect of the present disclosure may further include: a third substrate having a linear expansion coefficient smaller than the linear expansion coefficient of the second substrate; and a third intermediate layer provided between the wavelength conversion layer and the third substrate. The linear expansion coefficient of the third substrate may be smaller than the linear expansion coefficient of the wavelength conversion layer. A thermal conductivity of the third substrate may be larger than the thermal conductivity of the wavelength conversion layer. A thickness of the third intermediate layer may be smaller than the thickness of the wavelength conversion layer. The thickness of the third intermediate layer may be smaller than the thickness of the first substrate. The thickness of the third intermediate layer may be smaller than the thickness of the second intermediate layer.

In the wavelength conversion element according to the aspect of the present disclosure, the Young's modulus of the second intermediate layer may be smaller than a Young's modulus of the third intermediate layer.

In the wavelength conversion element according to the aspect of the present disclosure, an area of the wavelength conversion layer may be smaller than an area of the first substrate.

In the wavelength conversion element according to the aspect of the present disclosure, the wavelength conversion layer may have a first surface and a second surface different from the first surface, and the light in the first wavelength band may be incident on the first surface, and the light in the second wavelength band may be emitted from the second surface.

A light source device according to another aspect of the present disclosure may have the following configuration.

The light source device according to the aspect of the present disclosure includes: the wavelength conversion element according to the aspect of the present disclosure; and a light emitting element configured to emit the light in the first wavelength band to the wavelength conversion element.

A projector according to another aspect of the present disclosure may have the following configuration.

The projector according to the aspect of the present disclosure includes: the light source device according to the aspect of the present disclosure; a light modulation device configured to modulate light from the light source device in accordance with image information; and a projection optical device configured to project the light modulated by the light modulation device.

A method of manufacturing a wavelength conversion element according to another aspect of the present disclosure may have the following configuration.

The method of manufacturing a wavelength conversion element according to the aspect of the present disclosure includes: a first step of forming a first bonding layer on a wavelength conversion layer; a second step of forming a second bonding layer on a first substrate; a third step, which is after the first step and second step, of bonding, to a second substrate by a third bonding layer, any one of a surface of the wavelength conversion layer different from a surface on which the first bonding layer is formed and a surface of the first substrate different from a surface on which the second bonding layer is formed; and a fourth step, which is after the third step, of bonding the first bonding layer and the second bonding layer to form a fourth bonding layer. A linear expansion coefficient of the first substrate is smaller than a linear expansion coefficient of the wavelength conversion layer. The linear expansion coefficient of the wavelength conversion layer is smaller than a linear expansion coefficient of the second substrate. The linear expansion coefficient of the first substrate is smaller than the linear expansion coefficient of the second substrate.

In the method of manufacturing a wavelength conversion element according to the aspect of the present disclosure, a bonding temperature in the third step may be higher than a bonding temperature in the fourth step.

The method of manufacturing a wavelength conversion element according to the aspect of the present disclosure may further include: a fifth step of applying energy to the first bonding layer; and a sixth step of applying energy to the second bonding layer. The fourth step may be after the fifth step and the sixth step, and press and bond the first bonding layer and the second bonding layer to each other.

What is claimed is:

1. A wavelength conversion element comprising:
   a wavelength conversion layer configured to convert light in a first wavelength band into light in a second wavelength band different from the first wavelength band;
   a first substrate;
   a second substrate;
   a first intermediate layer provided between the wavelength conversion layer and the first substrate; and
   a second intermediate layer provided between the second substrate and any one of the wavelength conversion layer and the first substrate, wherein a linear expansion coefficient of the first substrate is smaller than a linear expansion coefficient of the wavelength conversion layer, the linear expansion coefficient of the wavelength conversion layer is smaller than a linear expansion coefficient of the second substrate, the linear expansion coefficient of the first substrate is smaller than the linear expansion coefficient of the second substrate, a thermal conductivity of the first substrate is larger than a thermal conductivity of the wavelength conversion layer, a thermal conductivity of the second substrate is larger than the thermal conductivity of the wavelength conversion layer, a thickness of the first intermediate layer is smaller than a thickness of the wavelength conversion layer, the thickness of the first intermediate layer is smaller than a thickness of the first substrate, and the thickness of the first intermediate layer is smaller than a thickness of the second intermediate layer.

2. The wavelength conversion element according to claim 1, wherein a Young's modulus of the second intermediate layer is smaller than a Young's modulus of the first intermediate layer.

3. The wavelength conversion element according to claim 1, further comprising:

a third substrate having a linear expansion coefficient smaller than the linear expansion coefficient of the second substrate; and a third intermediate layer provided between the wavelength conversion layer and the third substrate, wherein the linear expansion coefficient of the third substrate is smaller than the linear expansion coefficient of the wavelength conversion layer, a thermal conductivity of the third substrate is larger than the thermal conductivity of the wavelength conversion layer, a thickness of the third intermediate layer is smaller than the thickness of the wavelength conversion layer, the thickness of the third intermediate layer is smaller than the thickness of the first substrate, and the thickness of the third intermediate layer is smaller than the thickness of the second intermediate layer.

4. The wavelength conversion element according to claim 3, wherein a Young's modulus of the second intermediate layer is smaller than a Young's modulus of the third intermediate layer.

5. The wavelength conversion element according to claim 1, wherein an area of the wavelength conversion layer is smaller than an area of the first substrate.

6. The wavelength conversion element according to claim 1, wherein the wavelength conversion layer has a first surface and a second surface different from the first surface, and the light in the first wavelength band is incident on the first surface, and the light in the second wavelength band is emitted from the second surface.

7. A light source device comprising:

the wavelength conversion element according to claim 1; and a light emitting element configured to emit the light in the first wavelength band to the wavelength conversion element.

8. A projector comprising:

the light source device according to claim 7;

a light modulation device configured to modulate light from the light source device in accordance with image information; and a projection optical device configured to project the light modulated by the light modulation device.

9. A method of manufacturing a wavelength conversion element comprising:

a first step of forming a first bonding layer on a wavelength conversion layer;

a second step of forming a second bonding layer on a first substrate;

a third step, which is after the first step and the second step, of bonding, to a second substrate by a third bonding layer, any one of a surface of the wavelength conversion layer different from a surface on which the first bonding layer is formed and a surface of the first substrate different from a surface on which the second bonding layer is formed; and a fourth step, which is after the third step, of bonding the first bonding layer and the second bonding layer to form a fourth bonding layer, wherein a linear expansion coefficient of the first substrate is smaller than a linear expansion coefficient of the wavelength conversion layer, the linear expansion coefficient of the wavelength conversion layer is smaller than a linear expansion coefficient of the second substrate, and the linear expansion coefficient of the first substrate is smaller than the linear expansion coefficient of the second substrate.

10. The method of manufacturing a wavelength conversion element according to claim 9, wherein a bonding temperature in the third step is higher than a bonding temperature in the fourth step.

11. The method of manufacturing a wavelength conversion element according to claim 9, further comprising:

a fifth step of applying energy to the first bonding layer; and a sixth step of applying energy to the second bonding layer, wherein the fourth step is after the fifth step and the sixth step, and is to press and bond the first bonding layer and the second bonding layer to each other.

12. The method of manufacturing a wavelength conversion element according to claim 10, further comprising:

a fifth step of applying energy to the first bonding layer; and a sixth step of applying energy to the second bonding layer, wherein the fourth step is after the fifth step and the sixth step, and is to press and bond the first bonding layer and the second bonding layer to each other.

* * * * *